United States Patent Office

2,773,063
Patented Dec. 4, 1956

2,773,063

PREPARATION OF ACRYLAMIDES

Edward H. Specht, Huntingdon Valley, Andrew Neuman, North Hills, and Harry T. Neher, Bristol, Pa., assignors to Rohm & Haas Company, Philadelphia, Pa., a corporation of Delaware No Drawing. Application January 29, 1954,
Serial No. 407,174

18 Claims. (Cl. 260—247.2)

This invention concerns a method for preparing acrylamides. It deals with a process for making acrylamides from the primary materials acetylene, carbon monoxide, and basic nitrogen compounds having hydrogen available for reaction on amino nitrogen, the reaction being carried out catalytically under mild conditions. The reaction of these three substances is effected between 20° and about 100° C. by adding them to a reacting mixture wherein there are reacting acetylene, nickel carbonyl, an acid which is reactive with the nickel carbonyl to form a nickelous salt thereof and to make the carbonyl therefrom available for reaction in the reaction mixture, and a compound having a reactive hydrogen. In a major aspect of this invention, the process is directed to reacting together acetylene, carbon monoxide, and a basic nitrogen compound having reactive hydrogen on the nitrogen thereof in a reaction mixture wherein there are being reacted acetylene, nickel carbonyl, a said basic nitrogen compound, and an acid which is reactive with the nickel carbonyl to form a nickel salt and make the carbonyl therefrom available for reaction.

This application is a continuation-in-part of our application Serial No. 266,098, filed January 11, 1952, now abandoned.

Reaction of nickel carbonyl, acid, acetylene, and a primary or secondary amine was found by Reppe and his collaborators to yield acrylamides. While this reaction was regarded as involving the liberation of carbon monoxide by action of acid on nickel carbonyl, the direct reaction of acetylene, carbon monoxide, and hydrogen-bearing amine did not take place at moderate temperatures. We have confirmed these findings of the earlier workers in this field and have also observed that directly bringing together between 20° and 100° C. acetylene, carbon monoxide, nickel carbonyl, acid, and reactive amine does not lead to an acrylamide.

Reppe reported that he was able to obtain a catalytic reaction with carbon monoxide, acetylene, and amine under the energetic conditions used for forming esters from acetylene, carbon monoxide, and alcohol—the temperature, pressure, and catalysts being the same for the two reactions. These reactions required elevated pressures of the order of 30 atmospheres, temperatures between 150°–190° C., and catalysts such as nickel bromide or iodide, desirably with the addition of acid-reacting salts to repress side reactions. It was observed that there was a proclivity for the formation of vinylamines by direct addition of acetylene to amine. At the temperatures required in previous work nickel catalysts are depleted by reaction with carbon monoxide, organic halogen compounds are formed, and acetylene is decomposed or polymerized. At the high pressures and temperatures required for the catalytic operation heretofore attempted, special apparatus is essential and there arise all of the complications, problems, and hazards of handling acetylene at high temperatures and pressures.

Our process presents an advance over the previously known stoichiometric reaction of acetylene, nickel carbonyl, acid, and amine and over the previously suggested catalytic reaction of acetylene, carbon monoxide, and amine in the presence of nickel bromide or comparable salt. Our process uses a reduced proportion of nickel carbonyl with resultant savings in preparation of this material and recovery and regeneration of nickel compounds. It is effected more rapidly and efficiently than was the previously suggested catalytic process. It decreases the large proportions of by-products and contaminants which inevitably result from methods of the art. It avoids the hazards and disadvantages of handling acetylene at high pressures and temperatures. There are many other advantages.

We have discovered that after a stoichiometric reaction has been started with acetylene, nickel carbonyl, an acid acting as required on the nickel carbonyl, and a compound having reactive hydrogen, including water, carboxylic acids, alcohols, amines, mercaptans, and the like, there can be added to this reaction mixture carbon monoxide which then reacts with substances already present and with a basic amino body having hydrogen on the nitrogen thereof with formation of an acrylamide. If acetylene, carbon monoxide, and a said amino body are added in about reactive proportions, they continue to react catalytically as long as there is a stoichiometric reaction taking place. It will be evident that the preferred procedure is to react stoichiometrically with acetylene, nickel carbonyl, and reactive acid the same amino body as is to be used in the catalytic reaction of acetylene, carbon monoxide, and amino body. After the stoichiometric reaction has been started, the process can be made continuous by bringing together all five starting materials, acetylene, carbon monoxide, nickel carbonyl, acid, and amino body, in proper proportions. But the process can also be run batchwise.

In order to maintain the catalytic reaction of acetylene, carbon monoxide, and basic nitrogen compound according to this invention, there must be simultaneously maintained in the reaction mixture the reaction of acetylene, nickel carbonyl, an acid reacting therewith to make available carbonyl groups, and a basic nitrogen compound, this latter reaction for convenience being here termed the stoichiometric reaction. These two simultaneous reactions take place at a reacting temperature between 20° and about 100° C., better between 25° and about 90° C. Pressure is ordinarily not needed, but may be used, provided provision is made for removing heat of reaction. Our invention is based upon our discovery that the catalytic reaction of acetylene, carbon monoxide, and a said basic nitrogen compound can be superimposed upon a stoichiometric reaction, provided this latter reaction is maintained, as will be explained.

When the stoichiometric reaction starts, there is evidently formed in situ at an intermediate stage, possibly as an ephemeral product, a catalyst body which promotes the catalytic reaction, but the catalyst body must apparently be continuously generated by the stoichiometric reaction in order to maintain the catalytic reaction. This requires at least a minimum proportion of nickel carbonyl or conversely, this limits the maximum proportion of carbon monoxide which can be practically used, for, as has been pointed out, the presence of carbon monoxide in a mere mixture of acetylene, nickel carbonyl, acid, and reactive compound (here ammonia or non-tertiary amine) prevents any reaction in the initial mixture.

While, as has been noted, the stoichiometric reaction is desirably one involving ammonia or a primary or a secondary amine, particularly the amino body chosen for reaction in the catalytic reaction, an amino compound is not essential at the start. The required catalyst can be formed at the start by reacting, for example, acetylene, nickel carbonyl, an acid reacting therewith to provide active carbonyl groups in this reaction mixture, and water, the reaction thereof yielding acrylic acid and at the same time developing active catalyst. In the same way the initial reaction may involve acetylene, nickel carbonyl, and acrylic acid, there then being formed acrylic anhydride and also catalyst. In this situation acrylic acid serves both as reactant and as acid. The above are two convenient ways of starting the desired series of reactions.

Somewhat less attractive but still useful and effective is the initial step of reacting acetylene, nickel carbonyl, acid, and an alcohol or thiol, whereby an acrylic ester is formed and also a catalyst. Reaction is then continued with amino compound instead of alcohol or thiol. One advantage of starting with an alcohol as a compound supplying reactive hydrogen is that hydrochloric acid may be used from the start.

It is of interest that the catalytic step can be initiated through the stoichiometric reaction involving any compound having a reactive hydrogen for reacting with acetylene and carbonyl as liberated in the reaction mixture by action of a suitable acid on nickel carbonyl.

Usually the process is started by passing acetylene into a mixture containing nickel carbonyl, reactive acid, and a reactive hydrogen compound, which may be an amine. In a short time reaction generally starts as shown by absorption of acetylene, rise in temperature, and development of color. If the reaction fails to start spontaneously or is sluggish, it may be initiated or established by heating the reaction mixture. When the initial reaction has been established, the reaction of acetylene, carbon monoxide, and basic nitrogen compound is imposed thereupon. For example, carbon monoxide may be introduced into the reacting mixture of acetylene, nickel carbonyl, acid, and basic nitrogen compound. Reaction proceeds until the proportion of nickel carbonyl is so reduced that it supplies but a small part of the total CO.

In another way of operating, after the stoichiometric reaction has been established and while this is continued, particularly with an excess of amino compound in the reaction mixture, there are passed both carbon monoxide and acetylene into the reacting mixture. Again, there may be passed into the mixture in which the stoichiometric reaction is occurring acetylene, carbon monoxide, and a said amino compound. If at the same time there are supplied reacting proportions of acetylene, nickel carbonyl, reactive acid, and said amino compound to maintain the stoichiometric reaction, the process becomes continuous.

A convenient way to expedite the initial reaction is to start with a reaction medium which resembles an equilibrium mixture. For this purpose there are mixed a said amino compound, an amide of the type formed in the reaction, and a reactive acid, usually together with an inert organic solvent for these materials. Nickel carbonyl and acetylene are run into the mixture. Reaction generally starts spontaneously; if not, the mixture is warmed until reaction ensues. When the stoichiometric reaction is established, the catalytic reaction is imposed upon it. If continuous operation is to be practiced, the essential reactants, together with solvent, if used, are continuously added in balanced proportions. The reaction mixture is desirably stirred or circulated to allow time for substantial completion of the reaction and the reacted mixture is withdrawn from the reaction vessel at a rate commensurate with the addition of materials. If, through failure to maintain proper conditions in the reaction system, the reactions should cease, the supply of carbon monoxide is shut off, the stoichiometric reaction is re-established, and the catalytic reaction is then again imposed.

By adjustemnt of the rates of addition of the various reactants and withdrawal of reaction mixture, by control of holding time in the reaction vessel, by adjustment and control of proportions of reactants, and by control of temperature of the reaction mixture, the desired reaction can be obtained with a minimum of by-products. The reactions involved may be summarized by the equations:

(a)

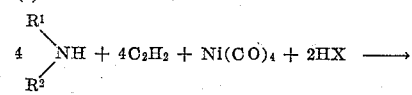

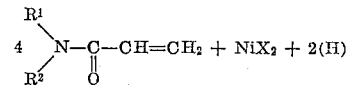

(b) 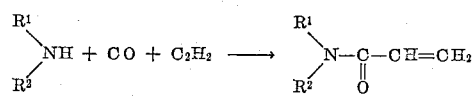

where $R^1$ and $R^2$ are hydrogen or any of the N-substituents recited below, and X is an acid-forming radical.

In actual fact no hydrogen appears, although it might be expected according to reaction (a). It must be consumed in side reactions. Hence, the greater the proportion of reaction (b) which can be maintained the smaller is the loss of materials in side reactions. There is, however, an upper range for the practical reaction with carbon monoxide. Although this varies somewhat with the particular choice of conditions of operation, and of amine, the practical upper limit for the carbon monoxide is about 80% of the total CO from both carbon monoxide and nickel carbonyl as available by reaction with acid. It is usually best to operate with between 50% and 70% of the total CO being supplied by carbon monoxide. From economic considerations it appears desirable to have at least 20% of the CO supplied by carbon monoxide.

Addition of acetylene is proportioned to the total CO and should generally be within a tenth mole of theory. Thus, the mole ratio of acetylene to total CO should be between 0.9:1 and 1.1:1, although operations can be maintained outside of these limits. With some amines it is best to operate with an excess of acetylene up to even 20%.

The amount of acid used is primarily determined by the nickel carbonyl supplied. The acid should conveniently be approximately equivalent to the nickel to form the nickelous salt of the acid, but exact proportions are not required. Nickel carbonyl may be in excess up to a practical limit of about 20%, particularly when hydrochloric acid is used. On the other hand, acid may be used in excess, particularly when an organic acid is used. It is best to operate within about 20% of equivalency. A small deficiency of acid in the main reaction may be made up in a subsequent clean-up step in which last portions of nickel carbonyl are consumed by reaction with acid, amino compound, and acetylene.

When the process is started with a basic nitrogen compound having hydrogen on the amino nitrogen, the best acid to use is acrylic acid. In place of this acid, however, there may be used another organic acid, particularly at the start. There may thus be used any lower aliphatic monocarboxylic acid, whether saturated or unsaturated, such as formic, acetic, propionic, butyric, acrylic, methacrylic, crotonic, propiolic, tetrolic, ethoxyacetic, ethoxypropionic, hydroxyacetic, hydroxypropionic, and the like. It will be noted that these acids are composed of carbon, hydrogen, and oxygen with a total of not over four carbon atoms. But similar acids with inert substitutents are also operative, such as chloroacetic and chloropropionic.

Although the primary function of the acid is to react with nickel carbonyl to make carbonyl therefrom available and to form a nickelous salt, it usually happens that some small amount of an acid amide is formed. Of course, if acrylic acid is used, any amide formed therefrom cannot be considered as a by-product. Hence, acrylic acid is the organic acid of first choice and may be desirably used not only at the start but throughout the reaction.

Yet, if acrylic acid is not available, reaction may be initiated with any of the other specified organic acids. After reaction has been established, there may also be used hydrochloric or even hydrobromic acid to react with nickel carbonyl. Hydrochloric acid may also replace the more expensive acrylic acid at this point. It may be noted that while hydrochloric acid is highly useful in effecting reaction with many compounds having reactive hydrogen, acetylene, and nickel carbonyl, it is not always useful for initiating the reaction when the said compound is an amino body.

Hydrochloric acid can be supplied as anhydrous hydrogen chloride or as aqueous hydrochloric acid. This is the most economical acid to use for maintaining the reaction. As has been pointed out above, hydrochloric acid can be used from the start when a stoichiometric reaction is started, for example, with an alcohol as a reactant and in this case is preferred. Alcohols may be used such as methyl, ethyl, propyl, isopropyl, butyl, isobutyl, sec-butyl, or tert-butyl alcohol, and an amino body then substituted therefor, the reaction being continued therewith. The small amount of acrylic ester formed at the start causes no trouble and, when the reaction is carried on with ammonia or amine, traces of ester soon cease to be found in the reaction product.

The nickel salt formed in the reaction is recovered and reconverted to nickel carbonyl for reuse in the process. A salt of the organic acid is conveniently converted with a strong mineral acid, such as sulfuric acid or hydrochloric acid, to the corresponding nickel salt and the organic acid is then recoverable and can be reused in the process. Where hydrochloric acid is used in the process proper, nickel is, of course, recovered directly as nickelous chloride.

Reactive amino compound is desirably used in an amount at least equivalent to the total CO. Commonly amine or ammonia is used in excess, although this is not essential. Amine or ammonia remaining in the reaction mixture may be taken out by washing with a little free acid to give an amine salt. The amine is, of course, recoverable therefrom and can be returned to the process. Usually, however, the amine is about stoichiometrically proportional to the total CO or conveniently in excess thereof up to about 10%.

The reaction is desirably carried out in most cases in the presence of an inert organic solvent such as acetone, methyl ethyl ketone, dioxane, ethyl ether, isopropyl ether, benzene, toluene, xylene, dimethyl ethers of ethylene glycols, methyl or ethyl ether esters of the glycols, and the like, and mixtures of solvents.

As amino bodies there may be used ammonia or primary and secondary amines, for which the general formula $$R_nNH_{3-n}$$

may be used where $n$ has a value from zero to two and R represents amine-forming substitutents. Free ammonia or amines may be used or, at least in part, salts thereof formed with an organic acid or with a hydrohalide.

Amines which are useful are primary and secondary amines generally of the type

where $R^1$ and $R^2$ are aliphatic, cycloaliphatic, arylaliphatic, aryl, or even heterocyclic. One of the groups $R^1$ and $R^2$ may be hydrogen. The two groups may together form a divalent chain which together with the nitrogen forms a heterocycle, as in pyrrolidine, piperidine, morpholine, or thiamorpholine, or lower alkyl substituted heterocyclic amines of this type, or N-methylpiperazine. In these amines $R^1$ and $R^2$ are saturated divalent aliphatic chains which together with the amine nitrogen form five- to six-sided heterocycles. In addition to these amines there may be mentioned methylamine, dimethylamine, ethylamine, diethylamine, butylamine, dibutylamine, isobutylamine, sec-butylamine, tert-butylamine, hexylamine, 2-ethylhexylamine, di(2-ethylhexyl)amine, octylamine, octylmethylamine, dioctylamine, 3,5,5-trimethylhexylamine, di(3,5,5-trimethylhexyl)amine, decylamine, decylmethylamine, dodecylamine, dodecylmethylamine, octadecylamine, benzylamine, benzylmethylamine, (butylbenzyl)amine, β-phenylethylamine, α-phenylethylamine, phenylpropylamine, cyclopentylamine, cyclohexylamine, methylcyclohexylamine, dicyclohexylamine, N-methylcyclohexylamine, allylamine, diallylamine, methallylamine, dimethallylamine, undecenylamine, octadecenylamine, ethanolamine, diethanolamine, N-methylethanolamine, cyclohexylethanolamine, phenylethanolamine, propanolamine, dipropanolamine, vinyloxyethylamine, vinyloxypropylamine, vinyloxyethoxyethylamine, methoxyethylamine, ethoxyethylamine, butoxyethylamine, phenoxyethylamine, N,N-dimethylaminopropylamine, N,N-dibutylaminopropylamine, tetrahydrofurfurylamine, aniline, naphthylamines, benzylaniline, methylaniline, ethylaniline, ring-substituted anilines and naphthylamines, β-aminopropionitrile, methyl-β-cyanoethylamine, β-phenoxypropylamine, β-(ethylamino)ethylamine, etc. The reaction is not limited to monoamines, but may also be applied to polyamines such as ethylenediamine, propylenediamine, butylenediamine, decamethylenediamine, phenylenediamine, etc. Where two or more functional groups are present in an amine, the reaction may take place with one or more of these groups.

Acetylene and carbon monoxide used in the process should be low in oxygen and preferably essentially free of oxygen. For stable, continuous operation the oxygen content of these gases should be less than one half percent. The acetylene should be relatively free of lower valence compounds of phosphorus and arsenic and without appreciable sulfur content. Purification by conventional methods is sufficient to assure a satisfactory gas. Inert gases such as carbon dioxide, nitrogen, or hydrogen act merely as diluents. Commercial sources of carbon monoxide and acetylene may thus be used with no more than simple precautions.

The reaction may be initiated at a temperature between 20° and 100° C. and carried out at a similar temperature. The range from 25° to 90° C. is preferred. Cooling is generally necessary to maintain the temperature at a desired and effective level. For any given basic nitrogen compound there is usually an optimum range of temperature or an optimum temperature for the maximum utilization of carbon monoxide together with the minimum loss of acetylene and the maximum conversion of amino body. With some amines, for example, amide formation is relatively slower at low to moderate temperatures than the rate of polymerization of acetylene in the particular reaction systems. Usually raising the temperature of these reaction systems accelerates greatly the rate of amide formation without a corresponding increase in the rate at which polymeric products are formed from acetylene. In many cases it appears that no polymeric materials are formed from acetylene as temperatures are raised into the range, for example, of 60° to 100° C. and polymeric materials which formed when the reaction was first carried out at, for example, 25° to 60° C. disappear as the reaction is continued on the higher range.

At the start of the reaction it is desirable to displace air from the reaction vessel by means of an inert gas such as nitrogen. The inert gas is replaced with acetylene and the reaction mixture is thereafter blanketed with a mixture of acetylene and carbon monoxide.

In one way of starting the process of this invention a reaction vessel is charged with a reactive amine, or ammonia, an organic acid in an amount about equivalent to the amine, and solvent, if used, as is usually desirable. Nickel carbonyl may be added directly to the mixture or it may be added in the form of a solution in a solvent. The vessel is swept out with an inert gas. Acetylene is passed into the mixture. In a short time reaction starts, usually spontaneously, but, if necessary, after the mixture is warmed. In another way of starting the process solvent is placed in the reaction vessel, the vessel is swept out with inert gas, and amine or ammonia, acid, nickel carbonyl, and acetylene are added in about equivalent amounts.

After the stoichiometric reaction has been established, carbon monoxide is also passed into the reaction mixture. If the reaction is to be operated continuously, there are added all in balanced proportions amine or ammonia, nickel carbonyl, acid, acetylene, and carbon monoxide together with solvent when desired.

If the reaction is run batchwise, the reaction mixture is at the end desirably treated with acid and acetylene, also amino compound, if needed, to consume all of the nickel carbonyl. If the reaction is performed in a continuous fashion, a stream taken by overflow or from a side stream is treated with acetylene and acid, and also, if needed, amino compound.

In either procedure care is taken to ensure thorough mixing of reactants. The gas streams themselves may be used to stir the reaction mixture. This stirring action may be supplemented with mechanical stirring and/or forced circulation.

The reaction mixture is worked up with removal of any excess amino compound, often conveniently by washing with aqueous acid, the acid is washed out and/or neutralized with an alkaline reagent, nickel salt is washed out, and the formed acrylamide is recovered. In many cases this product can be purified by distillation. Other appropriate steps may likewise be used, including charcoaling, extracting, crystallizing, and the like.

It is often desirable to use a polymerization inhibitor during formation of the acrylamide and particularly during its purification and isolation. If the product is purified by distillation, an inhibitor which passes over at least in part with the product is desirable in cases where polymerization occurs readily. Inhibitors include such substances as pyrogallol, tannic acid, hydroquinone, β-naphthol, picric acid, parahydroxydiphenylamine, copper, copper salts, and mixtures of inhibitors.

The process of this invention makes available not only acrylamide and N-substituted amides which have already been reported, but also many new amides. The amides are useful chemical intermediates. They undergo addition reactions with many classes of compounds having reactive hydrogen. The amides having a hydrogen on the amide nitrogen form methylol derivatives and the like. The amides thus may find use in fields such as pharmaceuticals, oil additives, and insecticides. As has been indicated the acrylamides form polymers. They also enter into copolymers. They thus find use in the fields of plastics, oil additives, paper, textiles, leather, coatings, and so on.

In the following illustrative examples further details of carrying out the process of this invention are shown.

*Example 1*

A reaction vessel equipped with stirrer, thermometer, cooling coil, inlet tubes for adding reactants, gas vent to a water-cooled condenser, trap, and meter, and an overflow for taking off reaction mixture was swept with nitrogen and charged with 173 parts by weight of acrylic acid, 160 parts of methyl ethyl ketone and one part of β-naphthol. Thereto aniline was slowly added with stirring and cooling to maintain the temperature below 35° C., the total amount added being 200 parts by weight. Flow of acetylene was started at the rate of 27.3 parts per hour. Flow was also started of a solution of 127 parts of nickel carbonyl in 280 parts of methyl ethyl ketone, the rate of flow being 136 parts of solution per hour. Within seven minutes the stoichiometric reaction began as shown by rise of temperature, absorption of gas, and development of a deep brown color which soon changed to a deep green. The temperature at the start was 32° C. and it rose to 55° C., at which level cooling was supplied. At ten minutes a flow of carbon monoxide was started at the rate of 14 parts per hour and the flow of acetylene was raised to 41.1 parts per hour. The temperature continued to rise and a temperature of about 70° C. was reached before sufficient cooling was supplied to bring the temperature down to 55° C., which level was maintained for the rest of the preparation. At 35 minutes it was noticed that the vent gas had increased. Thereupon the supply of carbon monoxide was shut off and the flow of acetylene was returned to 27.3 parts per hour. At 40 minutes the stoichiometric reaction was proceeding smoothly with complete absorption of acetylene. Carbon monoxide was then supplied at 14 parts per hour and flow of acetylene was raised again to 41.1 parts per hour. At 70 minutes the rates of flow were increased to 18.8 and 45.5 parts per hour for carbon monoxide and acetylene, respectively. At 80 minutes respective rates were increased to 23 and 49.6 parts per hour and at 90 minutes to 28 and 54.6 parts per hour. A flow of aniline was started at 85 minutes at the rate of 205 parts per hour. At 180 minutes the nickel solution had all been used. At 182 minutes the flow of carbon monoxide was discontinued. At 186 minutes the flow of acetylene was stopped.

Part of the reaction mixture was transferred to a still and the solvent was steam distilled therefrom. The residue was thoroughly washed with hot water to remove nickel salt. It was then washed with hot dilute (5%) hydrochloric acid solution to remove unused aniline and with hot water. The washed product was distilled under reduced pressure. At 148°–158° C./0.2 mm. a fraction was taken which solidified on cooling. The distillate was recrystallized from a mixture of methanol and water. The product then melted at 104.8°–105.1° C. It corresponded in composition to N-phenylacrylamide. The product contained by analysis 9.5% of nitrogen (theory 9.53%).

*Example 2*

A reaction vessel equipped as above was charged with 675 parts of reaction mixture from the previous example. There was prepared a solution of 213 parts of nickel carbonyl in 470 parts of methyl ethyl ketone. A flow of this solution was started into the charge at the rate of 136 parts of solution per hour. A flow of aniline was started at the rate of 102 parts per hour. Acetylene was started at 27.3 parts per hour. The stoichiometric reaction started within 12 minutes as shown by complete absorption of gas and rise of temperature. The temperature was controlled thereafter at about 50° C. At 15 minutes flow of carbon monoxide was started at 14 parts per hour, acetylene flow was raised to 41.1 parts per hour, and flow of aniline was increased to 153 parts per hour. At 15 minute intervals these rates were increased until at 60 minutes the rates were 28 parts of carbon monoxide, 54.6 parts of acetylene, and 204 parts of aniline per hour. At 30 minutes a feed of acrylic acid was started at 44 parts per hour. These rates were maintained. Overflow started at 190 minutes and reaction mixture was taken off in proportion to the rate of addition of materials. The overflow was treated with acetylene to consume any free nickel carbonyl therein. The reaction was stable and was continued for a long period of time.

The overflow after treatment with acetylene was worked up as shown in Example 1. The product fraction was obtained at 150°–159° C./0.2 mm. and corresponded in composition to N-phenylacrylamide. The conversion to this amide was 63% based on total CO.

Example 3

The reaction vessel was charged with 144 parts of acetic acid, 150 parts of methyl ethyl ketone, and one part of β-naphthol. The vessel was swept out with nitrogen. Aniline was slowly added to the above mixture with stirring and cooling, the temperature being kept below 35° C. The total amount of aniline here added was 200 parts. Acetylene was passed into the resulting mixture at the rate of 27.3 parts per hour. Flow was started of a solution of 127 parts of nickel carbonyl in 280 parts of methyl ethyl ketone at a rate of 136 parts per hour. At five minutes reaction began with rapid increase of temperature. Cooling was supplied to hold the temperature at about 50° C. At ten minutes a flow of carbon monoxide was started at the rate of 14 parts per hour. Acetylene flow was raised to 41.1 parts per hour. At 20 minutes the rates were made 18.8 and 45.5 parts per hour for carbon monoxide and acetylene, respectively. At ten minute intervals rates were increased until at 50 minutes rates were 34.2 parts of carbon monoxide and 60.6 parts of acetylene per hour. At 65 minutes flow of aniline was started at 227 parts per hour. The above rates of flow were continued with replacement of the solution of nickel carbonyl in methyl ethyl ketone. At 200 minutes a flow of acetic acid was started at a rate of 36 parts per hour.

Reaction product was taken off and treated with acetylene. It was then steam distilled to remove solvent. The residue was washed with hot water, dilute hot hydrochloric acid solution, and water again. The washed material was distilled under reduced pressure. A fraction was taken at 140°–150° C./0.1 mm.–0.2 mm. The distillate became solid when cool. The solid was taken up in hot carbon tetrachloride. When this solution was cooled, a small amount of crystals formed. The crystals were filtered off. They were identified as acetanilide, melting at 108°–112° C. They were mixed with an equal amount of pure acetanilide. The mixture melted at 112°–115° C. The carbon tetrachloride solution was evaporated to give a solid which nearly corresponded in composition to N-phenylacrylamide, but which melted at 101°–103° C.

Other lower monocarboxylic acids than acetic or acrylic can be used in the same way as above. Acrylic acid is the acid of first choice since it gives the purest products. But other acids can be used to effect the reaction particularly where high purity of final product is not a critical consideration. While theoretically such acid is consumed in forming a nickel salt, nevertheless some of it forms an amide.

Example 4

A reaction vessel equipped as above was charged with 208 parts of acrylic acid and 170 parts of toluene. To this mixture was slowly added with cooling 160 parts of n-butylamine. The carbonyl feeder was charged with a solution of 131 parts of nickel carbonyl in 309 parts of toluene. The apparatus was swept out with nitrogen. A flow of acetylene was started at 27.3 parts per hour. Flow of nickel carbonyl solution was started at the rate of 143 parts per hour. Reaction began at about 15 minutes. At 25 minutes flow of carbon monoxide was started at 14 parts per hour. Acetylene flow was increased to 41.1 parts per hour. The temperature was held at about 55° C. by cooling. Rates of flow were adjusted as follows, addition of amine being begun at 90 minutes—

| Time, minutes | Parts Per Hour | | |
|---|---|---|---|
| | Amine | Acetylene | Carbon Monoxide |
| 40 | | 45.5 | 18.8 |
| 55 | | 49.6 | 23.0 |
| 75 | | 54.6 | 28.0 |
| 90 | 161 | 54.6 | 28.0 |
| 100 | 178 | 60.6 | 34.2 |
| 110 | 201 | 68.1 | 42.0 |
| 125 | 230 | 78.0 | 52.1 |
| 135 | 241 | 82 | 56.0 |

At these rates of flow the carbon monoxide utilization was 67% of the total CO from both the monoxide and the nickel carbonyl. As the reaction proceeded acrylic acid was supplied about equivalent to the nickel carbonyl being added.

Reaction mixture was taken off and treated with acetylene to consume traces of nickel carbonyl. The mixture was then washed with water to remove free acid, free amine, and nickel salt. The mixture was then washed with dilute hydrochloric acid solution and again with water. The toluene solution was distilled after 0.5% of β-naphthol had been added as inhibitor. After removal of toluene and a small forerun a main fraction was taken at 88°–90° C./0.4 mm. It was a colorless liquid which corresponded in composition to N-n-butylacrylamide. It contained by analysis 10.8% of nitrogen (theory 11.0%). Conversion was 65% based on total CO.

Example 5

The reaction vessel used above was charged with 200 parts of toluene which was heated to 45° C. Into this solvent there were introduced streams of 2-aminoethyl vinyl ether at the rate of 96 parts per hour, nickel carbonyl at the rate of 43 parts per hour, acetylene at the rate of 27.3 parts per hour, and acrylic acid at the rate of 86.5 parts per hour. Within eight minutes the stoichiometric reaction was established. At 15 minutes a flow of carbon monoxide was started at 14 parts per hour, also solvent at 90 to 100 parts per hour, and the flow of acetylene was increased to 41.1 parts per hour and of 2-aminoethyl vinyl ether to 144 parts per hour. At 30 minutes rates were increased to 18.8 parts of carbon monoxide, 45.5 parts of acetylene, and 160 parts of 2-aminoethyl vinyl ether. At 40, 45, 50, and 55 minutes rates were again increased in stages to bring the rates to 60.6 parts of acetylene, 34.4 of carbon monoxide, and 213 parts of amine.

Reaction mixture was taken off and treated with acetylene. It was then washed with water and with a 5% sodium carbonate solution. The organic solution was distilled under reduced pressure after removal of toluene, the product being obtained as a yellow oil. This oil was fractionally redistilled through a packed column. The fraction taken at 85°–86° C./0.2 mm. corresponded in composition to N-(2-vinyloxyethyl)acrylamide. It contained by analysis 9.6% of nitrogen (theory 9.9%). When this oil was placed in the refrigerator it crystallized.

Example 6

The reaction vessel was swept with nitrogen and charged with 115 parts of acrylic acid and 245 parts of ethylene dichloride. This charge was saturated with acetylene. Streams of reactants were started as follows: ethanolamine at 67 parts per hour, acetylene at 27.3 parts per hour, and nickel carbonyl at 43 parts per hour. Within one minute reaction began with formation of an amber color which rapidly changed to a clear, light green. The temperature rose and was maintained with cooling at 40°–45° C. At 10 minutes flow of carbon monoxide was started at 14 parts per hour and the rate of flow of acetylene was raised to 41.1 parts and the rate of flow of ethanolamine to 100 parts per hour. At 20 minutes rates were adjusted to 18.8 parts of carbon monoxide, 45.5 parts of acetylene, and 112 parts of amine per hour. Subsequent increases in rates were made to bring the rates of flow to 28 parts of carbon monoxide, 54.6 parts of acetylene, and 134 parts of ethanolamine. Acrylic acid was then supplied at a rate of 43 parts per hour. The flow of nickel carbonyl was maintained at 43 parts per hour. Solvent was then supplied at 125 parts per hour.

Reaction mixture was taken off, treated with acetylene, and worked up by adding about one percent of its weight of hydroquinone and distilling directly, the heated mixture being stirred. After removal of solvent, products were distilled under reduced pressure. This distillate was redistilled and the main fraction was taken at 127°–130° C./0.1 mm. This product was N-(β-hydroxyethyl)acrylamide. It had a refractive index, $n_D^{19.7}$, of 1.5003.

Repetition of the above procedure with the proportion of ethanolamine being supplied at about half the above rate led to a first distillate which contained N-(β-hydroxyethyl)acrylamide and N-(β-acryloxyethyl)acrylamide. On redistillation the latter was obtained in a yield of 15% based on total CO. It distilled at 120° C./0.15 mm. as a viscous liquid.

*Example 7*

The reaction vessel was charged with 156 parts of acetone and 108 parts of acrylic acid. While this mixture was stirred there were slowly added with the temperature maintained at 40° C. nickel carbonyl at the rate of 43 parts per hour, ethylenediamine at the rate of 33 parts per hour, and acetylene at the rate of 27.3 parts per hour. Reaction began almost immediately with development of a brown color which soon changed to green. At 10 minutes carbon monoxide was introduced at 14 parts per hour, acetylene was raised to 41.1 parts per hour, and ethylenediamine to 49.5 parts. At 20 minutes flow of solvent was started at 90 parts per hour and was continued at this rate. At 25 minutes rates were increased as follows: carbon monoxide 23 parts, acetylene 49.6 parts, and amine 60 parts per hour. At 45 minutes rates were gradually increased to 34.2 parts of carbon monoxide, 60.6 parts of acetylene, and 73 parts of ethylenediamine per hour. At 150 minutes a flow of acrylic acid was started at 43 parts per hour. During reaction, temperature rose to 55° C. and was there maintained.

Reaction mixture was withdrawn and cooled to about 25° C. with formation of crystalline materials. The mixture was filtered. The solid was extracted several times with hot ethylene dichloride. The filtrate was evaporated to yield an almost white solid which was taken up in the hot ethylene dichloride solution. The product was crystallized therefrom after it had been cooled. This product was N,N'-ethylenediacrylamide, melting at 144°–5° C. It polymerizes when maintained at this temperature. By analysis a nitrogen content of 16.3% was found (theory 16.7%).

*Example 8*

The reaction vessel was charged with 156 parts of acetone and 115 parts of acrylic acid. Thereto was slowly added with stirring and cooling a highly branched primary alkyl amine having a neutral equivalent of 203. This amine is a mixture of tertiary $C_{12}H_{25}NH_2$ and $C_{15}H_{31}NH_2$, the hydrocarbon groups being those obtained from propylene tetramer and pentamer.

The amount of amine added at this time was 122 parts. Flow of acetylene was started at the rate of 27.3 parts per hour and then nickel carbonyl was supplied at 43 parts per hour. Reaction started within two minutes. Temperatures were maintained between 50° and 55° C. with the aid of cooling. At 15 minutes carbon monoxide was introduced at the rate of 14 parts per hour. Acetylene flow was increased to 41.1 parts per hour. At 25 minutes a flow of the amine was started at 335 parts per hour and a flow of acetone at 150 parts per hour. At 30 minutes rate of flow of acetylene was raised to 45.5 parts, of carbon monoxide to 18.8 parts, and of amine to 373 parts per hour. At 40 minutes a flow of acrylic acid was started at 80 parts per hour. At 45 minutes rates of flow were again adjusted to 54.6 parts of acetylene, to 28 parts of carbon monoxide, and to 450 parts of the amine.

Reaction product was taken off and washed with water, dilute hydrochloric acid, and water again. The organic layer was distilled. After the solvent was removed, there was obtained a fraction distilling at 130°–136° C./0.3–0.4 mm. Redistillation gave a product distilling at 117°–120° C./0.2–0.3 mm. and corresponding in composition to N-alkylacrylamide having alkyl groups of 12–15 carbon atoms. The nitrogen content was found to be 5.3% (theory 5.45%, from the neutral equivalent of 203).

*Example 9*

The reaction vessel was charged with 158 parts of acrylic acid, 156 parts of acetone, and two parts of β-naphthol and flushed with nitrogen. This mixture was stirred and cooled while 214 parts of N-methylaniline were slowly added. The carbonyl feeder was charged with a solution of 217 parts of nickel carbonyl and 464 parts of acetone. This was introduced in the reaction vessel at a rate of 133 parts per hour. Acetylene was introduced at the rate of 27.3 parts per hour. Reaction began within eight minutes. The temperature rose and was held at 45° C. by cooling. At 15 minutes flow of carbon monoxide was started at 14 parts per hour and acetylene flow was adjusted to 41.1 parts per hour. At 30, 40, and 50 minutes rates of flow of carbon monoxide and acetylene were increased until at 50 minutes the rates were 28 parts of carbon monoxide and 54.6 parts of acetylene per hour. At 70 minutes a flow of 235 parts per hour of N-methylaniline was started. At 120 minutes the rate of flow of carbon monoxide was increased to 34.2 parts and of acetylene to 60.6 parts per hour. At 130 minutes rates of flow were made 68.1 parts of acetylene and 42 parts of carbon monoxide. Amine flow was raised to 294 parts per hour. At 220 minutes flow of acrylic acid was started at the rate of 43 parts per hour along with 150 parts per hour of acetone. From this time on the reaction could be maintained indefinitely at these flow rates.

As reaction mixture was removed by overflow, it was treated with acetylene. The mixture was then washed with hot water, hot dilute hydrochloric acid, hot dilute sodium carbonate solution, and hot water again. The washed product was distilled under reduced pressure. A distillate was taken at 100–105° C./0.1 mm. When this was cooled, it crystallized. The crystals melted at 74°–76° C. and on recrystallization melted at 76°–77° C. The product corresponded in composition to N-methyl-N-phenylacrylamide.

By similar methods there are prepared from isopropylamine, N-isopropylacrylamide, distilling at 110°–115° C./15 mm. and melting at 62°–63° C.; from sec.-butylamine, N-sec.-butylacrylamide, distilling at 126°–130° C./20 mm.; from tert.-butylamine, N-tert.-butylacrylamide, melting at 128°–129° C.; from n-dodecylamine, N-n-dodecylacrylamide, melting at 55.5° C.; from cyclohexylamine, N-cyclohexylacrylamide, melting at 113°–114° C.; from morpholine, N-morpholinoacrylamide, distilling at 80°–84° C./< 1 mm.; from di(2-ethylhexyl)-amine, N,N-di(2-ethylhexyl)acrylamide, distilling at about 140° C./<1 mm.; from diethylamine, N,N-diethylacrylamide, distilling at 76°–77° C./7 mm.; from methylamine, N-methylacrylamide, distilling at 125°–130° C./30 mm.; from dimethylamine, N,N-dimethylacrylamide 80°–81° C./20 mm., etc.

Example 10

The reaction vessel was swept with nitrogen and charged with 172 parts of toluene and 43 parts of acrylic acid. The nickel carbonyl feeder was charged with 250 parts of nickel carbonyl in 594 parts of toluene. Reactant feeds were started as follows: acetylene at 27.3 parts per hour; nickel carbonyl solution at 144 parts per hour. Reaction began in fifteen minutes, forming initially acrylic anhydride from the acrylic acid present. At twenty minutes carbon monoxide was introduced at the rate of 9.3 parts per hour, dimethylamine was introduced at the rate of 60 parts per hour, and the feed rate of acetylene was increased to 38.0 parts per hour. At this time, also, a feed of glacial acrylic acid was started and maintained thereafter at a rate of 43 parts per hour. The temperature of the reaction mixture, initially at 25° C., was allowed to rise spontaneously as the reaction progressed until it had reached 80° C.; it was maintained thereafter in the range of 80–85° C. by cooling. At thirty-minute intervals after the introduction of carbon monoxide, the feed rate was increased in stages until at one hundred forty minutes it had reached the rate of 28 parts per hour. Corresponding increases were made in the feed rates of acetylene and dimethylamine until at one hundred forty minutes these rates were 54.6 and 90.0 parts per hour, respectively. These final rates corresponded to a utilization of carbon monoxide of 50%, i. e., of the total CO available for reaction 50% was supplied as gaseous carbon monoxide. The feed of dimethylamine provided an amount equivalent to the total CO. The acetylene feed provided a 5% excess over that theoretically required, based on total CO. Acrylic acid was supplied at a 20% excess over that theoretically required for nickel salt formation.

The reaction mixture became brown in color when the stoichiometric reaction was initiated. This color was supplanted by the green color of nickel acrylate as the reaction progressed. Solid nickel acrylate was present for a time, giving a light green slurry, but gradually redissolved after about three hours of operation to give a clear, deep green solution. A steady evolution of vent gas occurred during the reaction period, amounting to about 8% of the combined volumes of acetylene and carbon monoxide feeds.

After three hundred twenty-five minutes of operation the level of reaction mixture reached the top of the overflow pipe and was allowed to flow out, as formed, into a collection vessel which was kept under an atmosphere of nitrogen. Thus, with continuous feeds of all reactants and with continuous removal of reaction mixture, the process could be carried on indefinitely as described above.

At three hundred fifty minutes the nickel carbonyl feeder became empty and was shut off. All other feeds were continued for twelve minutes until an increasing vent rate showed that reaction was almost complete. At this time the carbon monoxide feed was shut off and the acetylene and dimethylamine feeds were reduced to 27.3 and 45 parts per hour, respectively, to use up the last traces of nickel carbonyl by stoichiometric reaction. Within fifteen minutes the reaction was complete as shown by a falling temperature and failure to absorb acetylene. All feeds were shut off and the reaction mixture was cooled and drained from the reaction vessel. That portion of reaction mixture which had previously been allowed to overflow was treated with acetylene at the rate of 27.3 parts per hour for a period of ten minutes to remove previously unreacted nickel carbonyl by stoichiometric reaction. A total of 22 parts of nickel carbonyl was recovered in "Dry Ice" traps.

The reaction mixture was distilled under vacuum with stirring. After removal of toluene a main fraction of 665 parts of N,N-dimethylacrylamide was taken, boiling at 65–70° C. under a pressure of 10 mm. This amount corresponded to a 67% yield of dimethylacrylamide, based on total CO consumed, i. e., from carbon monoxide gas plus unrecovered nickel carbonyl.

After careful fractional distillation the following data were obtained for the dimethylacrylamide:

Boiling point—65° C./10 mm.
Index of refraction, $n_D^{20}$, 1.4730
Nitrogen content—13.9% (calculated, 14.1%), and
Bromine No., 19.4 (calculated, 20.2).

Example 11

The reaction vessel was swept with nitrogen and charged with 430 parts of toluene and 43 parts of glacial acrylic acid. The carbonyl feeder was charged with 119 parts of nickel carbonyl in 283 parts of toluene.

A feed of nickel carbonyl solution was started at the rate of 144 parts per hour and a feed of acetylene at 27.3 parts per hour. A stoichiometric reaction began in twenty-two minutes with the usual brown coloration, a rise in temperature, and complete absorption of acetylene. At thirty minutes carbon monoxide was introduced at the rate of 14.0 parts per hour, dimethylamine was introduced at 68 parts per hour and the acetylene feed rate was increased to 41.1 parts per hour. At forty minutes anhydrous hydrogen chloride was introduced at the rate of 18.3 parts per hour and the nickel carbonyl feed rate was increased to 173 parts per hour. Solid nickel salt began precipitating to give a light green slurry. The temperature was allowed to rise from 23° C., initially, to 80° C. where it was thereafter maintained by cooling. At fifty-five minutes the carbon monoxide, acetylene and dimethylamine feed rates were increased to 18.8, 45.5 and 75 parts per hour, respectively, and again at ninety minutes were increased to their final values of 23.0, 49.7 and 82.0 parts per hour, respectively, corresponding to a utilization of carbon monoxide of 45%. At seventy minutes an additional feed of toluene was started and maintained thereafter at the rate of 258 parts per hour. The vent gas rate during steady operation at 45% carbon monoxide utilization was less than 2% of the combined feed rates of acetylene and carbon monoxide.

While this process could have been continued indefinitely, at one hundred and forty-five minutes the carbonyl feeder became empty and was shut off. The toluene feed was also shut off. The other reactant feeds were continued for a period of twenty-five minutes after which the carbon monoxide feed was shut off and the acetylene and dimethylamine feeds were reduced to 27.3 and 45 parts per hour, respectively, for a period of ten minutes to remove nickel carbonyl completely by stoichiometric reaction.

The reaction mixture, a green slurry, was filtered to remove most of the nickel salts. The filtrate was fractionally distilled to obtain, after removal of toluene, a main fraction distilling at 65–68° C./10 mm. This distillate was essentially pure dimethylacrylamide, having a refractive index, $n_D^{20}$, of 1.4730, a bromine number of 19.6 (calculated, 20.2), and a nitrogen content of 13.9% (calculated, 14.1%).

Example 12

The reaction vessel was equipped with a stirrer, an internal cooling coil, a thermometer, an inlet tube at the bottom for introduction of reactant feeds and an outlet tube at the top for vent gases.

The reaction vessel was swept with nitrogen and charged with 172 parts of toluene and 43 parts of glacial acrylic acid. The carbonyl feeder was charged with a solution of 87 parts of nickel carbonyl in 207 parts of toluene. A feed of acetylene was started at the rate of 27.3 parts per hour and a feed of nickel carbonyl solution at the rate of 144 parts per hour. A stoichiometric carbonyl reaction began within ten minutes, as shown by complete absorption of acetylene, a rise in temperature and a brown coloration in the reaction mixture. At twenty minutes dimethylamine was introduced at a rate of 45 parts per hour. At twenty-five minutes a feed of acrylic acid was started at the rate of 43 parts per hour. At the same time carbon monoxide was introduced at the rate of 9.3 parts per hour and the acetylene and dimethylamine feeds were increased to 38.0 and 60.0 parts per hour, respectively. The temperature was initially at 35° C.; it tended to rise when the reaction began but was controlled by cooling and held in the range of 30–35° C. throughout the remainder of the reaction period.

The color of the reaction mixture, instead of becoming a clear green as in reactions carried out at higher temperatures, became a deep, opaque brown. Absorption of gases was essentially complete, the amount of vent gas being negligible.

At one hundred ten minutes the reaction became unstable and the vent rate increased abruptly. The carbon monoxide feed was shut off and the acetylene and dimethylamine feeds were decreased to the stoichiometric rates, 27.3 and 45 parts per hour, respectively. Two minutes later the nickel carbonyl feed was shut off. At one hundred fifteen minutes the stoichiometric reaction began again and at one hundred twenty minutes the carbon monoxide feed was restored at 9.3 parts per hour, acetylene and dimethylamine were again raised to 38.0 and 60.0 parts per hour, respectively, and the feed of nickel carbonyl solution was resumed at 144 parts per hour. The reaction continued for five minutes and then again failed. Carbon monoxide was shut off and acetylene and dimethylamine returned to the stoichiometric rates. At one hundred thirty minutes the nickel carbonyl and acrylic acid feeds were shut off. Stoichiometric reaction continued for several minutes with complete absorption of acetylene until all nickel carbonyl had completely reacted.

The reaction mixture was filtered to remove solid nickel salt. The filtrate was distilled to obtain a 33% yield of dimethylacrylamide, distilling at 65–70° C. under a pressure of 10 mm.; bromine No.: calculated, 20.2; found, 19.6. A very large residue remained.

The maximum stable carbon monoxide utilization and yield of isolated dimethylacrylamide are given below for each run of a series in which the effect of reaction temperature was studied.

| Ref. | Temp., ° C. | Max. COU, Percent | Dimethyl-acrylamide Yield, Percent | Color of Reaction Mixture |
|---|---|---|---|---|
| Ge-1150 | 50 | 25 | 30 | opaque brown. |
| Ge-1156 | 60 | 33 | 40 | Do. |
| Ge-1158 | 70 | 45 | 60 | light brown. |
| Ge-1164 | 80–85 | 50–55 | 67 | clear green. |
| Ge-1168 | 85–90 | 50–55 | 65 | Do. |

The opaque brown color of the reaction mixtures at the lower temperatures is indicative of acetylene polymer formation. This side reaction can be avoided by operating above 70° C. In one run (Ge-1188) acetylene polymer was allowed to form by operation at a temperature of 50° C. with 33% carbon monoxide utilization; the reaction was not stable at 33% carbon monoxide utilization (COU) and three "deaths" occurred. The temperature was then raised to 85° C. The opaque brown color was gradually replaced by the normal green color and stability at 55% carbon monoxide utilization was readily obtained.

*Example 13*

The reaction vessel was swept with nitrogen and charged with 430 parts of toluene and 20 parts of acrylic acid. The carbonyl feeder was charged with 79 parts of nickel carbonyl and 187 parts of toluene.

The stoichiometric carbonyl reaction began within fifteen minutes after starting the following reactant feeds: acetylene, 27.3 parts per hour; nickel carbonyl solution, 144 parts per hour; and diethylamine, 80 parts per hour. At twenty minutes carbon monoxide was introduced at the rate of 14.0 parts per hour and the acetylene and diethylamine rates were raised to 41.1 and 120 parts per hour, respectively. At twenty-five minutes a feed of anhydrous hydrogen chloride was started at the rate of 18.3 parts per hour. At thirty-five minutes the feed rates of carbon monoxide, acetylene and diethylamine were increased to 18.8, 45.5 and 134 parts per hour, respectively, and at forty-five minutes, the nickel carbonyl feed rate was increased to 173 parts per hour. The temperature of the reaction mixture, originally at 25° C., was allowed to rise as the reaction progressed until it had reached 90° C. where it was maintained thereafter by cooling.

At about one hundred minutes the supply of nickel carbonyl solution in the feeder was exhausted and this feed was shut off. The carbon monoxide feed was also shut off and the acetylene and diethylamine feeds were reduced to 27.3 and 80 parts per hour, respectively. After fifteen minutes the diethylamine and hydrogen chloride feeds were shut off. The acetylene feed was continued for an additional fifteen minutes to ensure complete reaction of nickel carbonyl. The reaction mixture was dark brown and opaque, indicative of excessive acetylene absorption and condensation.

By distillation of the reaction mixture under reduced pressure, with stirring, N,N-diethylacrylamide was obtained, distilling at 61–62° C./3 mm.; $n_D^{20}$, 1.4672 (lit. $n_D^{20}$, 1.4672); percent N, 10.5 (calculated 11.0). The yield of N,N-diethylacrylamide, based on total CO, was 42%.

*Example 14*

The reaction vessel was swept with nitrogen and charged with 430 parts of toluene and 43 parts of glacial acrylic acid. The carbonyl feeder was charged with 94 parts of nickel carbonyl in 223 parts of toluene.

Reactant feeds were introduced as follows: acetylene, 27.3 parts per hour; nickel carbonyl solution, 173 parts per hour; and di-n-butylamine, 129 parts per hour. The stoichiometric reaction began within less than ten minutes. At twenty minutes carbon monoxide gas was introduced at the rate of 14.0 parts per hour and the acetylene and dibutylamine feeds were increased to 41.1 and 194 parts per hour respectively. The reaction mixture at this stage was a very deep green solution. At thirty minutes a feed of anhydrous hydrogen chloride was introduced at the rate of 18.3 parts per hour. At forty minutes an attempt was made to increase the carbon monoxide feed rate with corresponding increases in the feed rates of acetylene and dibutylamine. The reaction became unstable and gas absorption ceased. The reaction was restored by shutting off the carbon monoxide feed until the stoichiometric reaction had begun again. The feed rates of carbon monoxide, acetylene and dibutylamine were then readjusted to 14.0, 41.1 and 194 parts per hour, respectively. The feed rates of nickel carbonyl solution and hydrogen chloride were unchanged. The temperature, originally at 25° C. was allowed to rise to 80° C. and was maintained at 80° C. by cooling. Nickel salt precipitated to give a green slurry. At ninety five minutes 215 parts of toluene were added to dilute the slurry and facilitate stirring.

At one hundred ten minutes the feed of nickel carbonyl was shut off. Five minutes later the carbon monoxide feed was shut off and the acetylene and dibutylamine feeds were reduced to 27.3 and 129 parts per hour, respectively. Absorption of acetylene continued for twenty minutes. At the end of this time, falling temperature and increasing vent rate indicated the reaction was complete. The acetylene, dibutylamine and hydrogen chloride feeds were shut off and the reaction mixture was cooled and drained from the reaction vessel.

The reaction mixture was distilled under vacuum with stirring. After removal of toluene, N,N-dibutylacrylamide was obtained, distilling at 94–96° C./2 mm.; $n_D^{20}$ 1.4658; percent N, 7.4 (calculated, 7.65). The yield of N,N-dibutylacrylamide was 65%, based on the total CO consumed.

By the procedures shown in the two previous examples other dialkylamines may be reacted to form corresponding N,N-dialkylacrylamides. The two alkyl groups may be the same, as in di-2-ethylhexylamine, dinonylamine, or didodecylamine, but the two groups may also be different as in methyldodecylamine or methylhexadecylamine.

*Example 15*

The reaction vessel used was the same as that described in the preparation of N-phenylacrylamide. The amine used was a mixture containing chiefly n-dodecylamine with small amounts of amines of higher molecular weights. The average molecular weight of the amine mixture was about 191, as compared with 185 for pure n-dodecylamine.

The reaction vessel was swept out with nitrogen and charged with 430 parts of toluene and 43 parts of anhydrous acrylic acid. The carbonyl feeder was charged with a solution of 122 parts of nickel carbonyl in 290 parts of toluene. The initial reactant feed rates were as follows: acetylene, 27.3 parts per hour; amine mixture, 191 parts per hour; and nickel carbonyl solution, 144 parts per hour. The stoichiometric carbonyl reaction began within five minutes with the usual dark brown coloration which was gradually supplanted by the deep green color of nickel acrylate, a rise in temperature, and essentially complete absorption of the acetylene feed. The temperature, which was originally at 27° C., was allowed to rise spontaneously over a period of several minutes until it had reached 82° C. where it was held thereafter by cooling.

At fifteen minutes the catalytic portion of the overall reaction was initiated by introducing a feed of carbon monoxide at the rate of 14.0 parts per hour and simultaneously increasing the acetylene and amine feeds to 41.1 and 287 parts per hour, respectively. At about this time a feed of acrylic acid was started at the rate of 43 parts per hour; this feed supplied the required acid for nickel salt formation at a rate 20% in excess of that required theoretically by the nickel carbonyl feed rate. At fifteen minute intervals the carbon monoxide, acetylene and amine feed rates were increased to 18.8, 45.5 and 319, and then to 23.0, 49.7 and 348, all in parts per hour, respectively. At thirty minute intervals these same feed rates were raised to 28.0, 54.6 and 382 and then to the final rates of 34.2, 60.6 and 424 parts per hour, respectively. These final rates corresponded to 55% carbon monoxide utilization, i. e., 55% of the total available CO being supplied as gaseous carbon monoxide.

At one hundred five minutes the level of reaction mixture reached the top of the overflow pipe. The volume of reaction mixture was held constant from this time on by allowing the excess volume, as formed from the incoming reactants, to flow out into a collection vessel, maintained under an atmosphere of nitrogen. The reaction mixture was a clear, deep green, non-viscous solution. Non-absorbed gases were evolved through the vent line during this period of steady operation at a rate corresponding to less than 5% of the combined rates of acetylene and carbon monoxide feeds.

At one hundred seventy minutes the carbonyl feeder was empty and was shut off. Within two minutes the reaction showed signs of instability, i. e., falling temperature and increasing vent rate. The carbon monoxide feed was shut off and the acetylene and amine feed rates were decreased to 27.3 and 191 parts per hour, respectively. After ten minutes of stoichiometric reaction all nickel carbonyl had been used up; the above mentioned feeds and the acrylic acid feed were shut off. The reaction mixture was cooled and drained from the reaction vessel. The previously withdrawn reaction mixture was returned to the reaction vessel for removal of traces of unreacted nickel carbonyl by passing in acetylene until absorption ceased.

The reaction mixture, after standing and becoming cool, partially crystallized. The acrylamide product was isolated by distillation under reduced pressure. The yield of substituted acrylamide, being chiefly N-dodecylacrylamide, was 73%, based on total CO consumed; an average molecular weight of 245 was used for the acrylamide mixture, the average molecular weight of the amine mixture being 191. The distilling range of the acrylamide mixture was 167–180° C./1.5 mm.; percent N: calculated, 5.72; found, 5.7. The melting point of a sample purified by crystallization from 95% ethanol was 55.5–56° C.

In the same way other higher alkylamines may be reacted. When octadecylamine is used, it is best fed in a warm solution to maintain fluidity, a solution in toluene being suitable.

*Example 16*

The reaction vessel, the same as that described in the preparation of N-phenylacrylamide, was swept with nitrogen and charged with 430 parts of toluene and 43 parts of anhydrous acrylic acid. The carbonyl feeder was charged with a solution of 122 parts of nickel carbonyl in 290 parts of toluene.

The stoichiometric reaction was initiated six minutes after starting the following feeds: acetylene, 27.3 parts per hour; nickel carbonyl solution, 144 parts per hour; and amine, 191 parts per hour. The amine mixture used contained 90% or more n-dodecylamine, with smaller amounts of straight-chain aliphatic primary amines of higher molecular weight; the average molecular weight of the amine mixture was approximately 191.

At fifteen minutes carbon monoxide was introduced at the rate of 14.0 parts per hour, with simultaneous increases in the feed rates of acetylene and amine to 41.1 and 287 parts per hour, respectively; these rates corresponded to a carbon monoxide utilization of 33%. At twenty minutes anhydrous hydrogen chloride was introduced at the rate of 18.3 parts per hour to supply the acid required for nickel salt formation. At thirty, forty-five and sixty minutes increases were made in the feed rates of carbon monoxide, acetylene and amine to obtain utilizations of carbon monoxide of 40, 45 and 50%, respectively. At ninety minutes the carbon monoxide utilization was raised to 55% and held at that level for the remainder of the reaction period. The feed rates in parts per hour at this utilization was as follows: carbon monoxide, 34.2; acetylene, 60.6; and amine, 424. At this time, also, the feed rate of nickel carbonyl solution was increased to 173 parts per hour to provide a 20% excess of nickel carbonyl, based on the feed rate of hydrogen chloride. The reaction temperature was maintained at 80–85° C. by cooling.

At one hundred ten minutes overflow of reaction mixture began from the overflow pipe. The reaction mixture was a clear, dark green solution. At one hundred fifty-two minutes the feed of nickel carbonyl was shut off. Five minutes later the feed of carbon monoxide was shut off and the acetylene and amine feeds were reduced to the stoichiometric level, 27.3 and 191 parts per hour, respectively, for thirteen minutes to use up nickel carbonyl. All feeds were then shut off and the reaction mixture was drained from the reaction vessel. That portion of the reaction mixture which had previously overflowed was returned to the reaction vessel for removal of the excess, unreacted nickel carbonyl by means of the stoichiometric reaction. The reaction mixture partially solidified on cooling and standing. By distillation under reduced pressure the N-substituted acrylamide, being chiefly N-n-dodecylacrylamide, was isolated in 60% yield, based on total CO consumed.

Example 17

The reaction vessel, the same as that described in the preparation of N-phenylacrylamide, was swept with nitrogen and charged with 430 parts of toluene and 43 parts of anhydrous acrylic acid. The carbonyl feeder was charged with a solution containing 116 parts of nickel carbonyl and 276 parts of toluene.

The stoichiometric reaction began within ten minutes after starting the reactant feeds at the following rates: acetylene, 27.3 parts per hour; nickel carbonyl, 42.7 parts per hour (144 parts of solution per hour); and cyclohexylamine, 109 parts per hour. At fifteen minutes carbon monoxide was introduced at the rate of 14.0 parts per hour and the acetylene and cyclohexylamine feeds rates were simultaneously increased to 41.1 and 164 parts per hour respectively. At thirty minutes a feed of anhydrous acrylic acid was started at the rate of 43 parts per hour. At fifteen-minute intervals the carbon monoxide, acetylene and cyclohexylamine feed rates were increased in stages until at ninety minutes these rates were 34.2, 60.6, and 242 parts per hour, respectively, corresponding to a 55% utilization of carbon monoxide. The temperature, initially at 25° C., rose as soon as the reaction began and at forty-five minutes (after starting the reactant feeds) it had reached 80° C. where it was maintained thereafter by cooling. A solid nickel salt precipitated soon after the reaction began to give an olive green slurry. This salt gradually redissolved until at sixty minutes the reaction mixture had become a clear, deep green solution.

After one hundred sixty-two minutes the nickel carbonyl feeder was empty and was shut off; the acrylic acid feed was shut off. Five minutes later the carbon monoxide and amine feeds were shut off and the acetylene feed rate was reduced to 27.3 parts per hour. After about five minutes of stoichiometric reaction all nickel carbonyl had been used up.

Distillation of the reaction mixture under vacuum with stirring gave a main fraction of N-cyclohexylacrylamide, distilling at 130–5° C./2 mm. The yield based on total CO consumed, was 71%. After recrystallization from alcohol and water, colorless crystals were obtained, M. P. 113–114° C.

Example 18

The reaction vessel was swept with nitrogen and charged with 430 parts of toluene and 43 parts of glacial acrylic acid. The carbonyl feeder was charged with 119 parts of nickel carbonyl in 283 parts of toluene.

Acetylene was introduced at the rate of 27.3 parts per hour, nickel carbonyl solution at the rate of 144 parts per hour and dicyclohexylamine, at the rate of 200 parts per hour. At seven minutes the stoichiometric reaction began with a rise in temperature, a brown coloration in the reaction mixture and complete absorption of acetylene. Before introduction of carbon monoxide gas, the temperature of the reaction mixture was raised to 70° C. by supplying additional heat from a steam-coil. The temperature was then allowed to rise spontaneously as the reaction progressed, to 80° C., where it was maintained thereafter by cooling. At twenty minutes, carbon monoxide was introduced at the rate of 14.0 parts per hour, with a simultaneous increase in the feed rates of acetylene and dicyclohexylamine to 41.1 and 298 parts per hour, respectively. At thirty minutes a feed of glacial acrylic acid was started at the rate of 43 parts per hour. At fifty minutes and again at eight minutes the feed rates of carbon monoxide, acetylene and dicyclohexylamine were increased, the final rates being 23.0, 49.7 and 362 parts per hour, respectively, corresponding to a 45% utilization of carbon monoxide. These rates provided a 5% excess of acetylene, based on total CO; 10% excess amine, based on total CO; and 20% excess acrylic acid, based on nickel. The reaction mixture was a very dark green solution.

At one hundred sixty-eight minutes the carbonyl feeder was empty and was turned off. The carbon monoxide, dicyclohexylamine, and acrylic acid feeds were shut off and the acetylene feed was reduced to 27.3 parts per hour. Acetylene absorption continued for about fifty minutes. The reaction mixture darkened to a deep brown-green color, presumably because of the formation of acetylene condensation products.

The reaction mixture was washed with hot water containing hydrochloric acid to remove nickel salts and unreacted amine. The washed organic layer was distilled to obtain N,N - dicyclohexylacrylamide, boiling at 150–160° under a pressure of 3 mm. The distillate solidified in the receiver and after recrystallization from petroleum ether melted at 75–77° C.; percent nitrogen: calculated, 5.96; found, 5.5%.

Other cycloaliphatic amines can be used in place of cyclohexylamine or dicyclohexylamine with formation of the corresponding N-substituted acrylamides.

Example 19

The reaction vessel was equipped with a stirrer, an internal cooling coil, a thermometer, an inlet tube at the bottom for introduction of liquid and gaseous feeds and an outlet tube at the top for vent gases. Gaseous feeds were measured by manometric flow-meter and liquid feeds by proportioning pumps.

The reaction vessel was swept with nitrogen and charged with 430 parts of toluene and 43 parts of anhydrous acrylic acid. The nickel carbonyl feeder was charged with 91 parts of nickel carbonyl and 280 parts of toluene.

Reactant feeds were introduced at the following rates: acetylene, 27.3 parts per hour; nickel carbonyl, 42.7 parts per hour (144 parts of solution per hour); and aniline, 102 parts per hour. After eighteen minutes the stoichiometric reaction began. A brown color appeared in the mixture, later replaced by a deep clear green. The temperature, originally at 26° C., rose over a period of several minutes to 82° C. and was maintained at 82–83° C. thereafter by cooling.

At twenty-five minutes an attempt to introduce carbon monoxide, along with additional acetylene failed and absorption of gases ceased. The stoichiometric reaction was again initiated and at thirty-five minutes carbon monoxide was successfully introduced at the rate of 14.0 parts per hour. Simultaneously the acetylene feed rate was raised to 41.1 parts per hour and the aniline feed rate to 153 parts per hour. These rates corresponded to a utilization of carbon monoxide of 33%. A feed of acrylic acid was started at the rate of 43 parts per hour. At fifty minutes the carbon monoxide utilization was raised to 40% by increasing the carbon monoxide, acetylene and aniline feed rates to 18.8, 45.5 and 171 parts per hour, respectively. At sixty-five minutes the rates were increased to 23.0, 49.7 and 186 parts per hour, respectively, to obtain a carbon monoxide utilization of 45% and finally at ninety-five minutes the rates were increased to their final values of 28.0, 54.6 and 204 parts per hour, respectively, corresponding to a carbon monoxide utilization of 50%.

The reaction mixture was a clear, deep green solution. During this period of continuous operation the following reactant ratios prevailed: acetylene, 5% excess, based on total CO; aniline, 10% excess, based on total CO; and acrylic acid, 20% excess, based on nickel carbonyl. The rate of vent gas evolution amounted to about 10% of the combined feed rates of acetylene and carbon monoxide.

At one hundred sixty minutes, the nickel carbonyl feeder became empty and was shut off. The feeds of aniline and acrylic acid were also shut off. Seven minutes later, a rapidly increasing vent rate indicated the end of catalytic reaction. The carbon monoxide feed was shut off and the acetylene feed was reduced to 27.3 parts per hour. After eight minutes of stoichiometric reaction all nickel carbonyl had been consumed and the acetylene feed was shut off. The reaction mixture was cooled to room temperature and drained from the reactor. It was a clear deep green solution, which on standing deposited crystals of N-phenylacrylamide, giving a thick mush.

An aliquot of the reaction mixture was distilled under vacuum. After removal of toluene and unreacted aniline, N-phenylacrylamide came over at 120–130° C./0.8 mm. The distillate solidified in crystalline form; its melting point was 97–100° C. The yield of distillate, based on total CO consumed was 67.5% of the theoretical. After crystallization of the product from a mixture of methanol and water, its melting point rose to 104.5–105° C. (lit. 104–105° C.). Percent N: calculated, 9.53; found, 9.4.

*Example 20*

The reaction vessel, equipped with stirrer, thermometer, cooling coil, inlet tube for reactant feeds, outlet tube for vent gases and an overflow pipe, was swept with nitrogen and charged with 430 parts of toluene and 43 parts of anhydrous acrylic acid. The nickel carbonyl feeder was charged with a solution of 235 parts of nickel carbonyl in 558 parts of toluene.

To initiate the stoichiometric reaction acetylene was introduced at the rate of 27.3 parts per hour, nickel carbonyl solution at 144 parts per hour and aniline at 93 parts per hour. The reaction began in thirteen minutes with the appearance of a deep brown coloration in the reaction mixture, a rapid rise in temperature, and complete absorption of the acetylene. The brown color gradually changed to a deep green. The temperature, originally at 27° C., was allowed to rise as the reaction progressed and was finally held at 85° C. by cooling. At twenty minutes carbon monoxide was introduced at the rate of 14.0 parts per hour; the acetylene feed was increased to 41.1 parts per hour and the aniline feed rate to 139 parts per hour. At thirty minutes a feed of anhydrous hydrogen chloride was started at the rate of 18.3 parts per hour and was maintained at this rate for the remainder of the reaction period. Solid nickel salt began precipitating soon thereafter to give a light green, fluid slurry. At sixty minutes reactant feeds were increased to the following values, all in parts per hour: acetylene, 45.5; carbon monoxide, 18.8; and, aniline, 155. At one hundred forty minutes these rates were increased to 49.7, 23.0 and 169, respectively, and at two hundred minutes to 54.6, 28.0 and 186, respectively. These final rates, which were maintained for the remainder of the reaction period corresponded to a utilization of carbon monoxide of 50%, i. e., of the total available CO, 50% was supplied as gaseous carbon monoxide, the remaining 50%, in the form of nickel carbonyl. At this time the feed of nickel carbonyl solution was increased to 173 parts per hour to provide a 20% excess of nickel carbonyl, based on the hydrogen chloride feed rate. At about two hundred minutes the level of reaction mixture had reached the top of the overflow pipe and was thereafter allowed to spill over into a collection vessel under an atmosphere of nitrogen.

For the remainder of the reaction period the reaction was being carried out as a continuous operation with all reactants being supplied continuously in the ratios indicated below and with constant removal of reaction mixture in the same volume as that formed by the incoming reactants. Acetylene was being supplied in a 5% excess of that required by the total available CO; nickel carbonyl, in 20% excess of that required by the hydrogen chloride feed rate; and aniline, at a rate equivalent to the total CO, i. e., carbon monoxide gas plus that available from nickel carbonyl by reaction with hydrogen chloride.

At about three hundred minutes the nickel carbonyl feed was shut off. Absorption of gases continued for ten minutes, the reaction proceeding by using up the excess nickel carbonyl which had been supplied during the previous one hundred minutes. At the end of the ten-minute period the carbon monoxide feed was shut off, the acetylene feed was reduced to 27.3 parts per hour and the aniline feed to 93 parts per hour. After ten minutes of stoichiometric reaction the last traces of nickel carbonyl had been removed and the mixture was cooled and drained from the reactor.

That portion of reaction mixture which had previously been allowed to overflow was now returned to the reactor and the unreacted nickel carbonyl was removed by means of the stoichiometric reaction. Acetylene and aniline were supplied for a period of fifteen minutes at the rates of 27.3 and 93 parts per hour, respectively, and hydrogen chloride was supplied for ten minutes at the rate of 18.3 parts per hour.

The reaction mixture, a slurry while hot, a partially crystalline mass upon standing and becoming cool, was washed with hot water to remove nickel chloride, with dilute hydrochloric acid to remove traces of unreacted aniline and with sodium carbonate solution to remove acidity. The toluene solution was distilled to obtain N-phenylacrylamide, distilling at 120–132° C./0.7 mm. The distillate solidified in the receiver; after recrystallization from a methanol-water mixture colorless crystals were obtained, melting at 104.5–105° C.; percent N: calculated, 9.53; found, 9.5. The yield of N-phenylacrylamide was 72%, based on total CO consumed.

*Example 21*

The reaction vessel was swept with nitrogen and charged with 430 parts of toluene and 21 parts of glacial acetic acid. The carbonyl feeder was charged with 119 parts of nickel carbonyl and 284 parts of toluene.

Reactant feeds were started as follows: acetylene, 27.3 parts per hour; nickel carbonyl solution, 173 parts per hour; and aniline, 93 parts per hour. Within twelve minutes a brown coloration appeared in the reaction mixture, the temperature rose rapidly and complete absorption of the acetylene feed began. At eighteen minutes a feed of anhydrous hydrogen chloride was started and maintained thereafter at the rate of 18.3 parts per hour. At twenty minutes carbon monoxide was introduced at the rate of 14.0 parts per hour, with simultaneous increases in the feed rates of acetylene and aniline to 41.1 and 140 parts per hour, respectively. The temperature, initially at 27° C., was allowed to rise until it reached 50° C. and was maintained thereafter at 50–55° C. with cooling. At forty minutes and again at sixty minutes increases were made in the feed rates of carbon monoxide, acetylene and aniline, bringing these rates to final values of 23.0, 49.7 and 169 parts per hour, respectively, corresponding to a CO utilization of 45%. At ninety minutes the reaction mixture, a yellowish green slurry, became too thick for adequate stirring; 215 parts of toluene were added as diluent. One attempt was made, at ninety-five minutes, to raise the carbon monoxide utilization to 50% by again increasing the feed rates. The reaction became unstable and gas absorption ceased. It was readily restored, however to 45% CO utilization by shutting off the carbon monoxide feed and reducing the acetylene and aniline feeds to the rates used to initiate the stoichiometric reaction; as soon as the stoichiometric reaction began, all feeds were gradually raised to the rates indicated above for 45% carbon monoxide utilization.

At one hundred forty minutes the nickel carbonyl feeder was empty and was shut off. At one hundred sixty minutes the carbon monoxide feed was shut off and the acetylene and aniline feeds were reduced to 27.3 and 93 parts per hour, respectively. Within twenty minutes absorption of acetylene ceased and the temperature began to fall.

The reaction mixture was filtered while hot to remove nickel chloride. Part of the N-phenylacrylamide crystallized from the chilled filtrate; the remainder was obtained by distilling the filtrate to remove toluene and finally the product, distilling at 125–135° C. under a pressure of 1 mm. After the combined product was dissolved in methanol and decolorized with activated carbon, N-phenylacrylamide was reprecipitated by pouring the methanol solution into ice and water. The pure white solid melted at 104–105° C. The yield of N-phenylacrylamide was 67%, based on total CO.

*Example 22*

The reaction vessel was flushed with nitrogen and charged with 430 parts of toluene and 20 parts of glacial acrylic acid. The carbonyl feeder was charged with a solution of 120 parts of nickel carbonyl in 286 parts of toluene.

Reactant feeds were started as follows: acetylene, 27.3 parts per hour; nickel carbonyl solution, 173 parts per hour; and aniline, 93 parts per hour. The stoichiometric reaction began within twelve minutes. At this time a feed of aqueous 37.5% hydrochloric acid was started at the rate of 49 parts per hour. The temperature was allowed to rise from an initial value of 26° C. to 50° C. where it was maintained with cooling. At twenty-five minutes carbon monoxide gas was introduced at the rate of 14.0 parts per hour and, simultaneously, the acetylene and aniline feed rates were increased to 41.1 and 140 parts per hour, respectively. Nickel chloride began precipitating to give a greenish slurry which later became yellowish-green in color. At forty minutes and again at sixty minutes the feed rates of carbon monoxide, acetylene and aniline were increased, the final rates being 23.0, 49.7 and 169 parts per hour, respectively, these rates corresponding to a CO utilization of 45%. The reactant ratios, on the bases of theoretical equivalents, at this time were as follows: acetylene/total available CO, 1.05; nickel/HCl, 1.20; aniline/total available CO, 1.00. The reaction proceeded smoothly with almost complete absorption of the feed gases; the vent rate was approximately 1.5% of the combined feed rates of acetylene and carbon monoxide.

At one hundred forty minutes the carbonyl feeder became empty and was shut off. All other feeds were continued for a period of twenty minutes at the end of which the carbon monoxide feed was shut off and the acetylene and aniline feed rates were reduced to 27.3 and 93 parts per hour, respectively. Absorption of acetylene was completed within fifteen minutes and all feeds were shut off. After removal of nickel chloride by filtration of the hot reaction mixture, N-phenylacrylamide was obtained by distillation under reduced pressure. It was purified by dissolving in methanol, decolorizing with activated carbon and reprecipitating by pouring the solution into ice and water. The white, solid product melted at 104–105° C. The yield of N-phenylacrylamide was 61%, based on total CO.

*Example 23*

The reaction vessel was swept with nitrogen and charged with 430 parts of toluene and 43 parts of glacial acrylic acid. The nickel carbonyl feeder was charged with 246 parts of nickel carbonyl in 584 parts of toluene.

Stoichiometric reaction began within eight minutes after starting the reactant feeds as follows: acetylene, 27.3 parts per hour; nickel carbonyl solution, 173 parts per hour and N-methylaniline, 118 parts per hour. The temperature, originally at 25° C., was allowed to rise to 50° C. where it was maintained thereafter by cooling. Carbon monoxide was introduced at twenty minutes at the rate of 14.0 parts per hour and the acetylene and N-methylaniline feed rates were increased to 41.1 and 177 parts per hour, respectively. At thirty minutes a feed of anhydrous hydrogen chloride was started at the rate of 18.3 parts per hour. Nickel salts began precipitating, forming a light green slurry. At twenty- to thirty-minute intervals the carbon monoxide, acetylene and N-methylaniline feed rates were increased, in stages, until at one hundred fifty minutes these rates were: 52.1, 78.0 and 338 parts per hour, respectively. About this time the level of reaction mixture reached the top of the overflow pipe and was allowed, thereafter, to spill over into a collection vessel maintained under an atmosphere of nitrogen. The reaction mixture was a fluid slurry, yellowish-green in color, gradually becoming orange-tan as the reaction progressed.

During this period of continuous operation the following general conditions were in effect: 5% excess of acetylene, based on total available CO; 10% excess of N-methylaniline, based on total available CO; 20% excess nickel carbonyl, based on hydrogen chloride; 65% of the total available CO was being supplied in the form of carbon monoxide gas, the remainder as nickel carbonyl. The rate of vent gas evolution was less than 2% of the combined feed rates of acetylene and carbon monoxide.

At two hundred ninety minutes the nickel carbonyl feeder was empty and was shut off. Fifteen minutes later the carbon monoxide and N-methylaniline feeds were shut off and the acetylene feed was reduced to 27.3 parts per hour. The acetylene and hydrogen chloride feeds were continued for twenty minutes by which time all nickel carbonyl had reacted, indicated by falling temperature and increasing vent gas rate. The reaction mixture was drained and the portion which had previously been allowed to overflow was returned to the reaction vessel for removal of unreacted nickel carbonyl by stoichiometric reaction; acetylene and hydrogen chloride were passed in for thirty-five minutes at rates of 27.3 and 18.3 parts per hour, respectively.

The reaction mixture was filtered while hot to remove most of the nickel salt. Upon being chilled, the filtrate deposited crystals of N-methyl-N-phenylacrylamide which were removed by filtration. The resulting filtrate was distilled. After toluene was removed, N-methyl-N-phenylacrylamide came over at 80–85° C. under a pressure of 1 mm. The total yield of N-methyl-N-phenylacrylamide was 78%, based on total CO. The product was purified by dissolving in methanol and stirring the solution with activated carbon to remove colored impurities. When the filtered solution was poured into ice water, N-methyl-N-phenylacrylamide was reprecipitated as a white crystalline solid, M. P. 75–77° C. Recrystallization of a sample from methanol and water gave crystals melting at 76–77° C. Percent nitrogen: calculated, 8.70; found, 8.6.

*Example 24*

The reaction vessel was the same as that described in the preparation of N-phenylacrylamide. It was swept with nitrogen and charged with 430 parts of toluene and 43 parts of anhydrous acrylic acid. The carbonyl feeder was charged with 118 parts of nickel carbonyl and 280 parts of toluene. Reactant feeds were started as follows: acetylene, 27.3 parts per hour; morpholine, 87 parts per hour; and nickel carbonyl solution, 144 parts per hour. The stoichiometric reaction began in nine minutes with a sharp rise in temperature; the temperature, initially at 26° C., was allowed to rise spontaneously over a period of several minutes until it reached 80° C. at which level it was maintained by cooling. Carbon monoxide was introduced at fifteen minutes at a feed rate of 14.0 parts per hour, the acetylene and morpholine feed rates being raised simultaneously to 41.1 and 130 parts per hour, respectively. At thirty minutes an acrylic acid feed was started at the rate of 43 parts per hour. Beginning at thirty minutes and thereafter at fifteen-minute intervals the feed rates of carbon monoxide, acetylene and morpholine were increased in stages until at seventy-five minutes these rates were 34.2, 60.6 and 193 parts per hour, respectively, corresponding to a utilization of carbon monoxide of 55%. The reaction was stable at this level throughout the remainder of the reaction period. One attempt to raise the utilization to 60% resulted in almost immediate venting of all the gaseous feeds. The reaction was, however, rapidly restored to its former stability at 55% CO utilization by shutting off the carbon monoxide feed and decreasing the acetylene and morpholine feeds until the stoichiometric carbonyl reaction started again;

the appropriate feeds were then increased rapidly in stages to the rates given above for 55% carbon monoxide utilization. The feeds were maintained at the specified rates until one hundred sixty-five minutes at which time the nickel carbonyl feeder was empty and was shut off. Within three minutes it was necessary to shut off the feed of carbon monoxide and reduce the feed rates of acetylene and morpholine to 27.3 and 87 parts per hour, respectively, to remove the last of the nickel carbonyl by stoichiometric reaction. After ten minutes at the stoichiometric rates all feeds were shut off and the reaction vessel was drained.

The reaction mixture was distilled under vacuum with stirring. After removal of toluene, a main fraction distilling at 83–87° C. under a pressure of 1 mm. was obtained, consisting of essentially pure N-acrylylmorpholine; calculated for $C_7H_{11}O_2N$: percent N, 9.92; bromine No., 14.2; found: percent N, 9.94; bromine No., 14.2. The distillate was a colorless liquid, having a refractive index, $n_D^{20}$ of 1.5061. The yield of N-acrylylmorpholine, based on total CO consumed was 68%.

Example 25

The reaction vessel, the same as that described in the preparation of N-phenylacrylamide, was swept with nitrogen and charged with 430 parts of toluene and 43 parts of anhydrous acrylic acid. The nickel carbonyl feeder was charged with a solution of 110 parts of nickel carbonyl in 262 parts of toluene.

The stoichiometric reaction began within eight minutes after starting reactant feeds as follows: acetylene, 27.3 parts per hour; nickel carbonyl solution, 144 parts per hour; and morpholine, 87 parts per hour. The usual brown coloration appeared as the reaction began, the temperature rose sharply and complete absorption of the acetylene feed began. The temperature, originally at 25° C., was allowed to rise spontaneously over a period of several minutes until it had reached 85° C.; it was maintained thereafter in the range of 85–90° C. by cooling. At fifteen minutes carbon monoxide gas was introduced at the rate of 14.0 parts per hour and the acetylene and morpholine feeds were increased to 41.1 and 130 parts per hour, respectively, these rates corresponding to a CO utilization of 33%, i. e., 33% of the total available CO was being supplied as carbon monoxide gas. At twenty minutes a feed of anhydrous hydrogen chloride was introduced and was maintained thereafter at the rate of 18.3 parts per hour, to provide the required acid for nickel salt formation. The reaction mixture which at this stage was a clear green solution soon began to precipitate green crystals of nickel salt, forming a light green slurry. At thirty minutes the CO utilization was raised to 40% by increasing the carbon monoxide, acetylene and morpholine feeds to 18.8, 45.5 and 145 parts per hour, respectively. At forty-five minutes the above mentioned feed rates were increased to 23.0, 49.7 and 158 parts per hour, respectively, corresponding to 45% CO utilization. At the same time the nickel carbonyl feed rate was increased to 173 parts of solution per hour to provide from this time on a 20% excess of nickel carbonyl, based on the feed rate of hydrogen chloride. At sixty minutes the carbon monoxide, acetylene and morpholine feed rates were again increased up to 28.0, 54.6 and 174 parts per hour, respectively, corresponding to a CO utilization of 50%. The reaction began showing signs of instability—less exothermic, increased vent rate; stability was restored by increasing the morpholine feed rate to 192 parts per hour, thereby providing a 10% execess of morpholine, based on the total available CO. At eighty minutes a final increase in CO utilization was made up to 55%, by increasing the carbon monoxide, acetylene and morpholine feed to 34.2, 60.6 and 212 parts per hour, respectively. A further increase in morpholine feed rate to 239 parts per hour, corresponding to a 24% excess, was required to maintain stability of the reaction. The solid nickel salt which had previously precipitated now began to pass back into solution so that by the end of the reaction period the reaction mixture was a deep green solution.

The reaction was continued with a carbon monoxide utilization of 55% until one hundred thirty-five minutes at which time the nickel carbonyl feeder was empty and was shut off; the morpholine feed was also shut off. Five minutes later the carbon monoxide feed was shut off and the acetylene feed was reduced to 27.3 parts per hour for a period of ten minutes to complete the removal of nickel carbonyl by stoichiometric reaction.

By distillation from the reaction mixture N-acrylylmorpholine was isolated in 32% yield, based on total CO consumed.

Example 26

The reaction vessel was swept with nitrogen and charged with 430 parts of toluene and 43 parts of glacial acrylic acid. The carbonyl feeder was charged with a 29.7% (by weight) solution of nickel carbonyl in toluene.

Initial reactant feeds were started at the following rates: acetylene, 27.3 parts per hour; nickel carbonyl solution 144 parts per hour; and allylamine, 57 parts per hour. The stoichiometric carbonyl reaction began in five minutes, with a sharp rise in temperature, complete absorption of the acetylene feed, and a brown coloration in the reaction mixture. The brown color was soon replaced by a deep green, which continued throughout the reaction period. The temperature, initially at 27° C., was allowed to rise spontaneously until it reached 75° C. and was held, thereafter, at 75–78° C. by cooling. At fifteen minutes carbon monoxide was introduced at the rate of 14.0 parts per hour and the acetylene and allylamine feeds were increased to 41.1 and 86 parts per hour, respectively. At thirty minutes a feed of glacial acrylic acid was started at the rate of 43 parts per hour. Also at thirty minutes, the feed rates of carbon monoxide, acetylene and allylamine were increased to 18.8, 45.5 and 95 parts per hour, respectively, and at fifty-five minutes, to 23.0 49.7 and 104 parts per hour, respectively; these final rates corresponded to a carbon monoxide utilization of 45% and provided a 5% excess of acetylene, based on total CO, an equivalent amount of allylamine, based on total CO and a 20% excess of acid, based on nickel.

At one hundred five minutes the carbon monoxide, acetylene, and allylamine feed rates were increased to 28.0, 54.6 and 114 parts per hour, corresponding to a 50% utilization of carbon monoxide. After thirty minutes at these rates, however, the rate of vent gas evolution sharply increased showing imminent failure of the reaction. The feed rates were immediately returned to the values given above for 45% utilization of carbon monoxide, where they were held for the remainder of the reaction period.

At one hundred fifty minutes the feed of glacial acrylic acid was shut off and in its place, as a source of acid for nickel salt formation, a feed of anhydrous hydrogen chloride was started at the rate of 18.3 parts per hour and was continued for the remainder of the reaction period.

At two hundred minutes the feed rate of nickel carbonyl solution was increased to 173 parts per hour, thus providing a 20% excess of nickel carbonyl, based on the hydrogen chloride feed rate. This excess of nickel carbonyl gave added stability to the reaction and the rate of vent gas evolution which had been slowly increasing now returned to a uniform rate of about 2%, based on the combined feed rates of acetylene and carbon monoxide. When the reaction mixture reached the top of the overflow pipe, at about two hundred minutes, it was allowed to spill over and accumulate in a collection vessel under an atmosphere of nitrogen.

At two hundred seventy minutes the feed of nickel carbonyl solution was shut off. Absorption of gases continued for about twenty minutes. At the end of this time the carbon monoxide feed was shut off and the acetylene and allylamine feeds were reduced to 27.3 and 57 parts per hour, respectively, for a period of fifteen minutes to use up the remaining nickel carbonyl by stoichiometric reaction. The reaction mixture was cooled and drained from the reaction vessel and the previously withdrawn mixture was returned for removal of unreacted nickel carbonyl by stoichiometric reaction. About ten minutes was required with acetylene, allylamine and hydrogen chloride feeds at 27.3, 57.0 and 18.3 parts per hour, respectively.

The reaction mixture, a clear, deep green solution, was strip distilled under vacuum, with stirring, to remove all volatile material from nickel salts and very high-boiling by-products. This distillate was then redistilled, with fractionation, to obtain N-allylacrylamide, distilling at 75–78° C./0.5 mm.; percent nitrogen: calculated, 12.6%; found, 11.9%. The yield, based on total CO was 64%.

In the same way other unsaturated amines can be used in the process of this invention with formation of corresponding N-alkenyl acrylamides. Diallylamine reacts similarly to give N,N-diallylacrylamide.

*Example 27*

The reaction vessel, equipped with thermometer, stirrer, cooling coil, and inlet tubes, was swept with nitrogen and charged with 375 parts of ethylene dichloride and 43 parts of glacial acrylic acid. The nickel carbonyl feeder was charged with a 22.6% (by weight) solution of nickel carbonyl in ethylene dichloride. Reactant feeds were started at the following rates: nickel carbonyl solution, 189 parts per hour; acetylene, 27.3 parts per hour; and ethanolamine, 61 parts per hour. The stoichiometric carbonyl reaction began in eleven minutes with a rise in temperature and essentially complete absorption of acetylene. The temperature was originally at 23° C. and was allowed to rise to 60° C. where it was maintained thereafter by cooling. At twenty minutes a feed of carbon monoxide was introduced at the rate of 14.0 parts per hour and simultaneously the feed rate of acetylene and ethanolamine were increased to 41.1 and 92 parts per hour, respectively. At 25 minutes, anhydrous hydrogen chloride was fed at the rate of 18.3 parts per hour. At forty-five minutes the feeds of carbon monoxide, acetylene, and ethanolamine were increased to 18.8, 45.5, and 102 parts per hour, respectively; these rates corresponded to a carbon monoxide utilization of 40%. The reaction mixture was a clear, deep green solution.

At 165 minutes the feed of nickel carbonyl solution was shut off. Ten minutes later the carbon monoxide feed was shut off and the feed rates of acetylene and ethanolamine were reduced to 27.3 and 61 parts per hour, respectively, for a period of ten minutes to remove the last traces of nickel carbonyl by stoichiometric reaction.

Because of the great proclivity of the product toward polymerization, the reaction mixture was divided into small portions and subjected to distillation under reduced pressure in the presence of both β-naphthol and hydroquinone. After removal of the solvent, ethylene dichloride, a main fraction was taken, distilling at 136–140° C./0.3 mm.; redistillation of accumulated material again with both β-naphthol and hydroquinone present gave a colorless, water-soluble liquid distilling at 128–130° C./0.2 mm.; having a refractive index, $n_D^{20}$, of 1.5003. The percent of nitrogen calculated for N(2-hydroxyethyl)-acrylamide, is 12.2%; the nitrogen content found was 11.5%. The yield of final distillate was 42%, based on total CO consumed.

*Example 28*

The reaction vessel was swept with nitrogen and charged with 430 parts of toluene and 12 parts of anhydrous ethanol. The carbonyl feeder was charged with a 29.7% (by weight) solution of nickel carbonyl in toluene. To initiate the stoichiometric reaction the following reactant feeds were introduced: acetylene, 27.3 parts per hour; nickel carbonyl solution, 173 parts per hour; and anhydrous hydrogen chloride, 18.3 parts per hour. Absorption of acetylene by the stoichiometric carbonyl reaction with ethanol began in seven minutes. The temperature of the reaction mixture, originally at 27° C., was allowed to rise spontaneously as the reaction progressed until it had reached 75° C., where it was maintained thereafter by cooling. At ten minutes a feed of N-methylaniline was started at the rate of 107 parts per hour. Absorption of acetylene continued and at twenty minutes a first attempt was made to introduce carbon monoxide gas with simultaneous increases in the feed rates of acetylene and N-methylaniline. The reaction became unstable and gas absorption ceased. The feeds of carbon monoxide and N-methylaniline were temporarily shut off and the acetylene feed rate restored to 27.3 parts per hour. An additional 12 parts of ethanol was added and at twenty five minutes the stoichiometric reaction began again. The amino feed was again introduced at the rate of 107 parts per hour. At forty minutes carbon monoxide was successfully introduced at the rate of 14.0 parts per hour with simultaneous increases in the feed rates of acetylene and N-methylaniline to 44.1 and 161 parts per hour, respectively. These rates corresponded to a carbon monoxide utilization of 33%, i. e. of the total available CO, 33% was supplied in the form of gaseous carbon monoxide. Thereafter at ten to fifteen minute intervals the feed rates of carbon monoxide, acetylene, and N-methylaniline were increased in stages until at one hundred twenty five minutes these rates were 34.2, 60.6, and 238, respectively, corresponding to a carbon monoxide utilization of 55%.

At one hundred sixty five minutes the reaction mixture, a medium brown, fluid slurry, had reached the top of the overflow tube and was thereafter allowed to flow into a collection vessel maintained under an atmosphere of nitrogen. At 180 minutes an attempt was made to increase the feed rates to obtain a 60% carbon monoxide utilization. The reaction, however, became unstable and gas absorption ceased. The carbon monoxide feed was shut off and the acetylene feed rate reduced to 27.3 parts per hour. The feed rate of N-methylaniline was left unchanged. Stoichiometric reaction began again within one minute; no ethanol was added for this start-up. Within ten minutes all feeds had been restored to the rates corresponding to 55% CO utilization and were maintained at that level for the remainder of the reaction period.

At 285 minutes the feed of nickel carbonyl solution was shut off. Absorption of gases continued for about ninety minutes; at the end of this time the feeds of carbon monoxide and N-methylaniline were shut off and the acetylene feed rate was reduced to 27.3 parts per hour. After fifteen minutes the last traces of nickel carbonyl had been removed by stoichiometric reaction and the acetylene and hydrogen chloride feeds were shut off. The reaction mixture was drained from the reaction vessel and that portion which had previously overflowed was returned to the reaction vessel for removal of the remaining nickel carbonyl by stoichiometric reaction, using hydrogen chloride, acetylene, and N-methylaniline feed rates of 18.3, 27.3 and 107 parts per hour, respectively, until absorption of acetylene ceased.

The total reaction mixture was filtered while still hot to remove the precipitated nickel chloride. On standing and cooling to room temperature the filtrate deposited large colorless crystals of N-methyl-N-phenylacrylamide which were removed by filtration. The remainder of the product was recovered from this filtrate by distillation under reduced pressure, the product solidifying in the receiver. The total yield of N-methyl-N-phenylacrylamide was 71%, based on the total CO consumed.

Example 29

The reaction vessel, the same as that used in the preparation of N-substituted acrylamides, was flushed with nitrogen and charged with 172 parts of toluene and 43 parts of acrylic acid. The carbonyl feeder, maintained under an atmosphere of nitrogen, was charged with a 29.7% (by weight) solution of nickel carbonyl in toluene. All gaseous reactants, carbon monoxide, acetylene, hydrogen chloride, and ammonia were metered into the reaction vessel using manometric flowmeters.

Reactant feeds were started as follows: acetylene, 27.3 parts per hour; nickel carbonyl solution, 173 parts per hour. The stoichiometric reaction began in eight minutes. The temperature was allowed to rise from an initial 29° C. up to 80° C. and was maintained thereafter at about 80° C. by cooling. At fifteen minutes feeds of carbon monoxide and ammonia were introduced at rates of 14.0 and 25.5 parts per hour, respectively. The feed rate of acetylene was increased to 41.1 parts per hour. At 30 minutes a feed of anhydrous hydrogen chloride was introduced at the rate of 18.3 parts per hour. At 40 minutes the feed rates of carbon monoxide, acetylene, and ammonia were raised to 18.8, 45.5 and 28.4 parts per hour, respectively, and at 85 minutes to 23.0, 49.7 and 31.0 parts per hour, respectively. At this time the rate of vent gas evolution, which was already high, began to increase. At ninety-five minutes 100 parts of dimethylformamide was added as an auxiliary solvent. Immediately after this addition, the rate of vent gas evolution dropped to approximately 5% of the combined feed rates of acetylene and carbon monoxide.

At 120 minutes a second addition of 100 parts of dimethylformamide was made and five minutes later the feed rates of carbon monoxide, acetylene, and ammonia were raised to 28.0, 54.6 and 34.0 parts per hour, respectively, corresponding to a carbon monoxide utilization of 50%. At one hundred eighty minutes a third addition of 100 parts of dimethylformamide was made and the above feed rates were increased to 34.2, 60.6 and 37.8 parts per hour, respectively, corresponding to 55% carbon monoxide utilization. Since the vent rate began to increase, indicating instability, the rates were restored to the 50% utilization level where they were held for the remainder of the reaction period.

At 290 minutes the feed of nickel carbonyl solution was shut off, all other feeds being continued at the rates indicated above for 50% CO utilization. After seventeen minutes the feed of carbon monoxide was shut off and the acetylene and ammonia feed rates were reduced to 27.3 and 17 parts per hour, respectively. Within 18 minutes all remaining nickel carbonyl had been consumed by the stoichiometric reaction. The feeds of acetylene, ammonia, and hydrogen chloride were shut off and the reaction mixture was cooled and removed from the reaction vessel. Because of the high vent gas rate during the early part of the reaction, a large quantity of nickel carbonyl, 45 parts, was recovered from the Dry Ice traps in the vent line.

The reaction mixture, a light green slurry, was subjected to distillation under reduced pressure and with stirring. After removal of solvents, acrylamide came over and solidified in the receiver. It was recrystallized from benzene to obtain glistening plates melting at 84.2–84.5° C. and corresponding in composition to acrylamide.

Example 30

The reaction vessel was swept with nitrogen and charged with 215 parts of toluene and 43 parts of glacial acrylic acid. The carbonyl feeder, maintained under an atmosphere of nitrogen, was charged with a 29.7% (by weight) solution of nickel carbonyl in toluene.

To initiate the stoichiometric reaction, feeds of acetylene and nickel carbonyl solution were started at rates of 27.3 and 144 parts per hour, respectively. The reaction began within twenty minutes, as shown by essentially complete absorption of acetylene, a rise in temperature, and a brown coloration in the mixture. The brown color soon disappeared, being replaced by the green color of nickel acrylate. At 30 minutes a feed of glacial acrylic acid was started at the rate of 43 parts per hour, carbon monoxide gas was introduced at the rate of 14.0 parts per hour, a feed of ammonia was started at the rate of 17 parts per hour, and the feed rate of acetylene was raised to 41.1 parts per hour. At 60 minutes and again at 90 minutes, the feed rates of carbon monoxide, acetylene, and ammonia were raised, the final rates being 23.0, 49.7 and 31.0 parts per hour, respectively, corresponding to a carbon monoxide utilization of 45%. The reaction was continued at this level for a period of two hundred minutes, with the temperature maintained at 70–75° C. with cooling. The feeds of nickel carbonyl solution and carbon monoxide were then shut off and the feed rates of acetylene and ammonia were reduced to 27.3 and 17 parts per hour, respectively, to provide for complete removal of the last traces of nickel carbonyl by stoichiometric reaction. When an increasing vent gas rate and falling temperature indicated the completion of the reaction, the feeds of acetylene, ammonia, and acrylic acid were shut off and the reaction mixture was cooled and drained from the reaction vessel.

The reaction mixture was subjected to distillation under reduced pressure and with stirring. After removal of toluene and unreacted acrylic acid, acrylamide came over and solidified in the receiver. After recrystallization from benzene it melted at 84–85° C.

Example 31

The reaction vessel was swept with nitrogen and charged with 430 parts of toluene and 30 parts of glacial acrylic acid. The carbonyl feeder was charged with a 29.7% (by weight) solution of nickel carbonyl in toluene.

The stoichiometric reaction began within eight minutes after the following reactant feeds had been introduced: acetylene, 27.3 parts per hour, nickel carbonyl solution, 173 parts per hour, anhydrous hydrogen chloride, 18.3 parts per hour, and N-methylaniline, 107 parts per hour. The temperature, initially at 30° C. was allowed to rise spontaneously as the reaction progressed until it had reached 80° C. where it was maintained thereafter by cooling. At 20 minutes carbon monoxide gas was introduced at the rate of 14.0 parts per hour with simultaneous increases in the acetylene and N-methylaniline feed rates to 41.1 and 161 parts per hour, respectively. At 30 minutes the feed of N-methylaniline was discontinued and in its place a feed of anhydrous dimethylamine was introduced at the rate of 68 parts per hour. Thereafter, at intervals of 30 minutes the feed rates of carbon monoxide, acetylene, and dimethylamine were raised in two stages until carbon monoxide gas was supplying 45% of the total CO available, the other 55% being derived from nickel carbonyl. The rates of the above reactants at this final level of operation were 23.0, 49.7 and 82.0 parts per hour, respectively.

The reaction was continued for 180 minutes from the initial introduction of reactants. At this time the feeds of nickel carbonyl solution and carbon monoxide were shut off and the feed rates of acetylene and dimethylamine were reduced to 27.3 and 45 parts per hour, respectively, to consume previously unreacted nickel carbonyl by stoichiometric reaction. When absorption of acetylene ceased and the temperature began to fall, showing completion of the reaction, the reaction mixture was drained from the reaction vessel.

The reaction mixture, a green slurry, was filtered to remove most of the nickel salts. The filtrate was subjected to fractional distillation. After removal of toluene, dimethylacrylamide was obtained, distilling at 65–68° C./10 mm. The relatively small amount of N-methyl-N-phenylacrylamide, formed during the start-up period, was allowed to remain in the distillation residue.

*Example 32*

The reaction vessel was swept with nitrogen and charged with 430 parts of toluene and 43 parts of glacial acrylic acid. The carbonyl feeder, maintained under nitrogen, was charged with a 29.7% (by weight) solution of nickel carbonyl in toluene.

Feeds of acetylene and nickel carbonyl solution were introduced at rates of 27.3 and 144 parts per hour, respectively. The stoichiometric carbonyl reaction began within 12 minutes and at 15 minutes a feed of benzylamine was started at the rate of 107 parts per hour. At 25 minutes carbon monoxide gas was introduced at the rate of 14.0 parts per hour and the feed rates of acetylene and benzylamine were increased to 41.1 and 161 parts per hour, respectively. At thirty minutes a feed of anhydrous hydrogen chloride was introduced at the rate of 18.3 parts per hour. At 50, 75, and 95 minutes the feed rates of carbon monoxide, acetylene, and benzylamine were increased in stages, the final rates being 28.0, 54.6 and 214 parts per hour, respectively. Absorption of feed gases continued with only a small amount of gas being evolved from the reaction vessel. The temperature was maintained at 80° C. with cooling.

At 130 minutes the feed of nickel carbonyl was shut off. Ten minutes later the feed of carbon monoxide was shut off and the feed rates of acetylene and benzylamine were reduced to 27.3 and 107 parts per hour, respectively. Within an additional 12 minutes the last traces of nickel carbonyl had been consumed and the feeds of acetylene, benzylamine, and hydrogen chloride were shut off. The reaction mixture, a green slurry, was cooled and removed from the reaction vessel.

The reaction mixture was washed with water to remove nickel salts, with sodium carbonate solution to remove acidity, and finally with water. The organic layer was subjected to distillation under reduced pressure to obtain, after removal of solvent, N-benzylacrylamide, distilling at 138–140° C./0.3 mm. The distillate solidified in the receiver. The yield of N-benzylacrylamide was 65%, based on total CO consumed.

*Example 33*

The reaction vessel was swept with nitrogen and charged with 400 parts of toluene and 43 parts of glacial acrylic acid. The carbonyl feeder was charged with 54 parts of nickel carbonyl and 128 parts of toluene.

Reactant feeds were started as follows: nickel carbonyl solution, 144 parts per hour and acetylene, 27.3 parts per hour. At 22 minutes the stoichiometric reaction began and a feed of glacial acrylic acid was started at the rate of 43 parts per hour. At 30 minutes carbon monoxide was introduced at the rate of 14.0 parts per hour and the feed rate of acetylene was simultaneously increased to 41.1 parts per hour. Two minutes later a feed of 3-dimethylaminopropylamine was started at the rate of 153 parts per hour. At 50 minutes the feed rates of carbon monoxide, acetylene, and 3-dimethylaminopropylamine were raised to 18.8, 45.5, and 170 parts per hour, respectively, and at 65 minutes to 23.0, 49.7 and 186 parts per hour, respectively; the latter rates corresponded to a carbon monoxide utilization of 45%. The temperature, originally at 27° C., was allowed to rise spontaneously as the reaction progressed until it had reached 80° C., where it was maintained thereafter by cooling. The reaction mixture was a very deep green solution.

At 75 minutes the nickel carbonyl feeder was empty and this feed was shut off. All other reactant feeds were continued for 25 minutes, at the end of which time the carbon monoxide, acrylic acid, and 3-dimethylaminopropylamine feeds were shut off and the acetylene feed rate was reduced to 27.3 parts per hour to complete the removal of nickel carbonyl by stoichiometric reaction. After five minutes the reaction was complete, the acetylene feed was shut off, and the reaction mixture was cooled and drained from the reaction vessel.

The reaction mixture was subjected to distillation under reduced pressure with stirring. After removal of toluene, a fraction was taken, distilling at about 103° C./1 mm. The product as obtained was N-(3-dimethylaminopropyl)acrylamide, containing a trace of free acrylic acid; but it was used without further purification in the preparation of water-soluble polymers, useful as textile sizes.

*Example 34*

The reaction vessel was swept with nitrogen and charged with 430 parts of toluene and 43 parts of glacial acrylic acid. The carbonyl feeder, maintained under nitrogen, was charged with a 29.7% (by weight) solution of nickel carbonyl in toluene.

The stoichiometric carbonyl reaction began within 20 minutes after starting reactant feeds at the following rates: acetylene, 27.3 parts per hour and nickel carbonyl solution, 144 parts per hour. At 25 minutes the feed of 2-vinyloxyethylamine was started at the rate of 87 parts per hour. At 30 minutes a feed of carbon monoxide gas was introduced at the rate of 14.0 parts per hour. A feed of glacial acrylic acid was started at the rate of 43 parts per hour. The feed rates of acetylene and 2-vinyloxyethylamine were simultaneously raised to 41.1 and 131 parts per hour, respectively, providing for a carbon monoxide utilization of 33%. At 48, 75, and 105 minutes, the rates of carbon monoxide, acetylene, and 2-vinyloxyethylamine were increased in stages, the final rates being 28.0, 54.6 and 174 parts per hour, respectively, corresponding to a carbon monoxide utilization of 50%. These rates were maintained throughout the remainder of the reaction period. The temperature of the reaction, initially at 26° C., rose spontaneously as the reaction progressed, reaching 80° C., within the first hour; thereafter, cooling was required to maintain the temperature at 80° C.

At 200 minutes the reaction mixture, a light green slurry, began to overflow into a collection vessel which was maintained under nitrogen. At 305 minutes the feeds of nickel carbonyl solution and carbon monoxide were shut off and the feed rates of acetylene and 2-vinyloxyethylamine were reduced to the stoichiometric level, 27.3 and 87 parts per hour, respectively. Within ten minutes all previously unreacted nickel carbonyl in the reaction vessel had been consumed. All feeds were shut off and the reaction mixture was cooled and drained from the reaction vessel. That portion of reaction mixture which had previously overflowed was then returned to the reaction vessel and the last traces of nickel carbonyl removed by stoichiometric reaction with feeds of acetylene and 2-vinyloxyethylamine being supplied for a period of ten minutes at rates of 27.3 and 87 parts per hour, respectively.

The product, N-(2-vinyloxyethyl)acrylamide, was obtained from the reaction mixture by distillation under reduced pressure and with stirring, naphthol being added as a polymerization inhibitor. The product was a colorless liquid, boiling at 100–112° C./1 mm.; upon standing at room temperature the distillate solidified; percent nitrogen: calculated, 9.93; found, 9.6. The yield of N-(2-vinyloxyethyl)acrylamide was 62%, based on the total CO consumed.

The products resulting from the process of this invention are useful in forming polymers and copolymers for a wide variety of applications, including coatings, paper impregnants, textile sizes, finishing agents, and modifiers, thickeners, formation of easily dyeable fibers, yarns, and films, additives for lubricating oils and greases to improve viscosity index, pour point and the like, molding compositions where improvements in heat-resistance, and flexural strength are desired, cast blocks and sheets to impart favorable stretch-orientation properties, as agents for improving the rate of polymerization of other monomers, etc. The products are useful as chemical intermediates, reacting both at the double bond, as in Michael addition reactions, and the amido group. For example, primary and secondary amides react with aldehydes, such as formaldehyde to form N-methylol compounds. For individual acrylamides there are special applications, some of which have been indicated above.

As is evident from the large number of examples presented above, the process of this invention is applicable to the production of a great variety of acrylamides, many of which have hitherto not been preparable by any convenient method. This process utilizes basic starting materials, a fact which provides economies, and at the same time produces a minimum of by-products.

We claim:

1. A process for preparing acrylamides which comprises first reacting together at a temperature between 20° and 100° C. acetylene, nickel carbonyl, an organic carboxylic acid RCOOH where R is an aliphatic hydrocarbon group of not over three carbon atoms, and a basic nitrogen compound having hydrogen on the amino nitrogen thereof, and while these are reacting, introducing carbon monoxide into the reaction mixture and their reacting it at a reacting temperature between 20° and 100° C.

2. A process for preparing acrylamides which comprises first reacting together at a temperature between 20° and 100° C. acetylene, nickel carbonyl, an organic carboxylic acid RCOOH where R is an aliphatic hydrocarbon group of not over three carbon atoms, and a basic nitrogen compound having hydrogen on the amino nitrogen thereof, and while these are reacting, adding to the reacting mixture and there reacting together at a reacting temperature bttween 20° and 100° C. acetylene, carbon monoxide, and the said basic nitrogen compound, the carbon monoxide supplying between 20% and 80% of the total CO from both carbon monoxide and nickel carbonyl.

3. A process for preparing acrylamides which comprises first reacting together at a temperature between 20° and 100° C. acetylene, nickel carbonyl, and organic carboxylic acid RCOOH where R is an aliphatic hydrocarbon group of not over three carbon atoms, and an amine having hydrogen on the amino nitrogen thereof, and while these are reacting, adding to the reacting mixture and there reacting together at a temperature between 20° and 100° C. acetylene, carbon monoxide, the said acid, nickel carbonyl, and the said amine, the carbon monoxide supplying between 20% and 80% of the total CO from both carbon monoxide and nickel carbonyl, the acid being equivalent within about 20% to the nickel to form a nickelous salt of said acid, and the acetylene being equivalent to the total CO within 10%.

4. A process for preparing acrylamides which comprises first reacting together at a temperature between 20° and 100° C. acetylene, nickel carbonyl, acrylic acid, and an amine having hydrogen on the amino nitrogen thereof, and while these are reacting, adding to the reacting mixture and there reacting together between 20° and 100° C. acetylene, carbon monoxide, acrylic acid, nickel carbonyl and the said amine, the carbon monoxide supplying between 50% and 70% of the total CO from both carbon monoxide and nickel carbonyl, the acid being equivalent within about 20% to the nickel to form nickel acrylate, and the acetylene being supplied in stoichiometric excess of the total CO.

5. A process for preparing acrylamides which comprises first reacting together at a temperature between about 25° and about 90° C. acetylene, nickel carbonyl, acrylic acid, and a primary amine, and while these are reacting, adding to the reacting mixture and there reacting together between about 25° and about 90° C. acetylene, carbon monoxide, acrylic acid, nickel carbonyl, and the said amine, the carbon monoxide supplying between 50% and 70% of the total CO from both carbon monoxide and nickel carbonyl, the amine being supplied in excess of the total CO, the acetylene being equivalent to the total CO within 10%, taking off reaction mixture, adding to it acrylic acid in an amount at least equivalent to nickel carbonyl therein, and treating it with acetylene until any nickel carbonyl is consumed.

6. The process of claim 5 wherein the amine is aniline.

7. The process for preparing acrylamides which comprises first reacting together at a temperature between about 25° and about 90° C. acetylene, nickel carbonyl, acrylic acid, and a secondary amine, and while these are reacting, adding to the reacting mixture and there reacting together between about 25° and about 90° C. acetylene, carbon monoxide, acrylic acid, nickel carbonyl, and the said amine, the carbon monoxide supplying between 50% and 70% of the total CO from both carbon monoxide and nickel carbonyl, the amine being supplied in excess of the total CO, the acetylene being equivalent to the total CO within 10%, taking off reaction mixture, adding to it acrylic acid in an amount at least equivalent to nickel carbonyl therein, and treating it with acetylene until any nickel carbonyl is consumed.

8. The process of claim 7 wherein the amine is N-methylaniline.

9. The process of claim 7 wherein the amine is morpholine.

10. The process of claim 7 wherein the amine is dimethylamine.

11. A process for preparing acrylamide which comprises reacting together at a temperature between 20° and 100° C. acetylene, nickel carbonyl, an organic carboxylic acid RCOOH where R is an aliphatic hydrocarbon group of not over three carbon atoms, and ammonia, and while these are reacting, adding to the reacting mixture and there reacting together at a reacting temperature between 20° and 100° C. acetylene, carbon monoxide, and ammonia, the carbon monoxide supplying between 20% and 80% of the total CO from both carbon monoxide and nickel carbonyl.

12. The process of claim 11 wherein the acid is acrylic acid.

13. In a process wherein there are first reacted between 20° and 100° C. acetylene, nickel carbonyl, an aliphatic monocarboxylic acid containing only carbon, hydrogen, and oxygen with a total of not over four carbon atoms, and a compound having reactive hydrogen, whereby the stoichiometric reaction thereof is effected, the improvement which comprises adding to this reacting mixture and therein reacting together at a reacting temperature between 20° and 100° C. acetylene, carbon monoxide, and a basic amino compound having at least one hydrogen on the amino nitrogen thereof.

14. In a process wherein there are first reacted between 20° and 100° C. acetylene, nickel carbonyl, an acid which is reactive with the nickel carbonyl to form a nickelous salt and make the carbonyl therefrom available for reaction in this reaction mixture, and a compound having reactive hydrogen, whereby the stoichiometric reaction thereof is effected, the improvement which comprises adding to this reacting mixture and therein reacting together at a reacting temperature between 20° and 100° C. acetylene, carbon monoxide, and a basic amino compound having at least one hydrogen on the amino nitrogen thereof.

15. A process for preparing acrylamides which comprises first reacting together at a temperature between 20° and 100° C. acetylene, nickel carbonyl, an aliphatic monocarboxylic acid containing only carbon, hydrogen, and oxygen with a total of not over four carbon atoms, and a basic amino compound having at least one hydrogen on the amino nitrogen thereof, adding to this reacting mixture and there reacting together at a reacting temperature between 20° and 100° C. acetylene, carbon monoxide, nickel carbonyl, an acid which is reactive with the nickel carbonyl to form a nickel salt and make the carbonyl therefrom available for reaction, and a basic amino compound having at least one hydrogen on the amino nitrogen thereof, the carbon monoxide supplying between 20% and 80% of the total CO from both carbon monoxide and nickel carbonyl.

16. A process according to claim 15 wherein the said aliphatic monocarboxylic acid is acrylic acid.

17. A process according to claim 16 wherein the said added acid which is reactive is also acrylic acid.

18. A process according to claim 16 wherein the said added acid which is reactive is hydrochloric acid.

References Cited in the file of this patent

Reppe: Acetylene Chem., pp. 155–62 (1949).